(12) United States Patent
Foy et al.

(10) Patent No.: US 8,911,132 B1
(45) Date of Patent: Dec. 16, 2014

(54) EDGELIT OPTIC ENTRANCE FEATURES

(71) Applicants: Adam Moore Foy, Peachtree City, GA (US); Scott David Wegner, Peachtree City, GA (US)

(72) Inventors: Adam Moore Foy, Peachtree City, GA (US); Scott David Wegner, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/833,911

(22) Filed: Mar. 15, 2013

(51) Int. Cl.
*F21V 7/04* (2006.01)
*F21V 8/00* (2006.01)

(52) U.S. Cl.
CPC .................. *G02B 6/002* (2013.01)
USPC ........... 362/606; 362/607; 362/608; 362/612; 362/616; 362/628

(58) Field of Classification Search
USPC ............... 362/606, 607, 608, 612, 616, 628
See application file for complete search history.

(56) References Cited

U.S. PATENT DOCUMENTS

| | | | | |
|---|---|---|---|---|
| 3,976,364 A * | 8/1976 | Lindemann et al. | ......... | 359/667 |
| 5,775,792 A * | 7/1998 | Wiese | ............ | 362/328 |
| 6,139,163 A * | 10/2000 | Satoh et al. | ............ | 362/612 |
| 6,193,383 B1 * | 2/2001 | Onikiri et al. | ............ | 362/26 |
| 6,474,826 B1 * | 11/2002 | Tanaka et al. | ............. | 362/612 |
| 6,685,342 B2 * | 2/2004 | Terada | ............ | 362/327 |
| 6,824,285 B2 * | 11/2004 | Saitoh et al. | ............. | 362/629 |
| 6,935,764 B2 * | 8/2005 | Choi et al. | ............. | 362/326 |
| 7,188,987 B2 * | 3/2007 | Yu | ............ | 362/608 |
| 7,220,042 B2 * | 5/2007 | Tseng | ............ | 362/619 |
| 7,401,965 B2 * | 7/2008 | Xu et al. | ............ | 362/621 |
| 7,448,786 B2 * | 11/2008 | Yue | ............ | 362/618 |
| 7,546,009 B2 * | 6/2009 | Kukulj et al. | ............. | 385/33 |
| 7,614,768 B2 * | 11/2009 | Stanitzok et al. | ............. | 362/327 |
| 7,798,696 B2 * | 9/2010 | Lee et al. | ............ | 362/612 |
| 7,862,222 B2 * | 1/2011 | Tsai | ............ | 362/616 |
| 8,064,744 B2 * | 11/2011 | Atkins et al. | ............. | 385/33 |
| 8,066,408 B2 * | 11/2011 | Rinko | ............ | 362/268 |
| 8,162,524 B2 * | 4/2012 | Van Ostrand et al. | ......... | 362/606 |
| 8,184,236 B2 * | 5/2012 | Aritake et al. | ............. | 349/65 |
| 2003/0099118 A1 * | 5/2003 | Saitoh et al. | ............. | 362/561 |
| 2003/0235047 A1 * | 12/2003 | Choi et al. | ............ | 362/31 |
| 2006/0044831 A1 * | 3/2006 | Yu | ............ | 362/615 |
| 2006/0083028 A1 * | 4/2006 | Sun et al. | ............ | 362/615 |
| 2006/0088244 A1 * | 4/2006 | Kukulj et al. | ............. | 385/33 |
| 2006/0109684 A1 * | 5/2006 | Nesterenko et al. | ......... | 362/610 |
| 2006/0203514 A1 * | 9/2006 | Tseng | ............ | 362/615 |
| 2006/0203518 A1 * | 9/2006 | Tseng | ............ | 362/621 |
| 2006/0262563 A1 * | 11/2006 | Xu et al. | ............ | 362/615 |
| 2006/0285356 A1 * | 12/2006 | Tseng | ............ | 362/608 |
| 2007/0047258 A1 * | 3/2007 | Yao et al. | ............ | 362/615 |
| 2007/0103936 A1 * | 5/2007 | Yue | ............ | 362/613 |
| 2007/0121340 A1 * | 5/2007 | Hoshi | ............ | 362/600 |
| 2007/0189036 A1 * | 8/2007 | Chen et al. | ............. | 362/613 |
| 2007/0217226 A1 * | 9/2007 | Zhu et al. | ............. | 362/615 |

(Continued)

*Primary Examiner* — Thomas A Hollweg
(74) *Attorney, Agent, or Firm* — King & Spalding LLP

(57) ABSTRACT

Optic entrance features may be used to optically control light transfer from a light source to a light emitting panel (LEP). In a particular embodiment, an LEP includes a first LEP side configured to emit light. The LEP also includes a second LEP side. The first LEP side and the second LEP side are opposite sides of the LEP. The LEP further includes a cutout area providing an air gap in the LEP through the first LEP side and the second LEP side. The LEP also includes a light receiving side. The cutout area is proximal to the light receiving side, and the light receiving side is configured to pass light through towards the cutout area.

29 Claims, 14 Drawing Sheets

(56) References Cited

U.S. PATENT DOCUMENTS

| | | | |
|---|---|---|---|
| 2007/0274100 A1* | 11/2007 | Yang et al. | 362/615 |
| 2008/0055935 A1* | 3/2008 | Ono et al. | 362/623 |
| 2008/0075414 A1* | 3/2008 | Van Ostrand | 385/146 |
| 2008/0089092 A1* | 4/2008 | Lee et al. | 362/612 |
| 2008/0094853 A1* | 4/2008 | Kim et al. | 362/612 |
| 2008/0111796 A1* | 5/2008 | Atkins et al. | 345/175 |
| 2009/0016057 A1* | 1/2009 | Rinko | 362/268 |

* cited by examiner

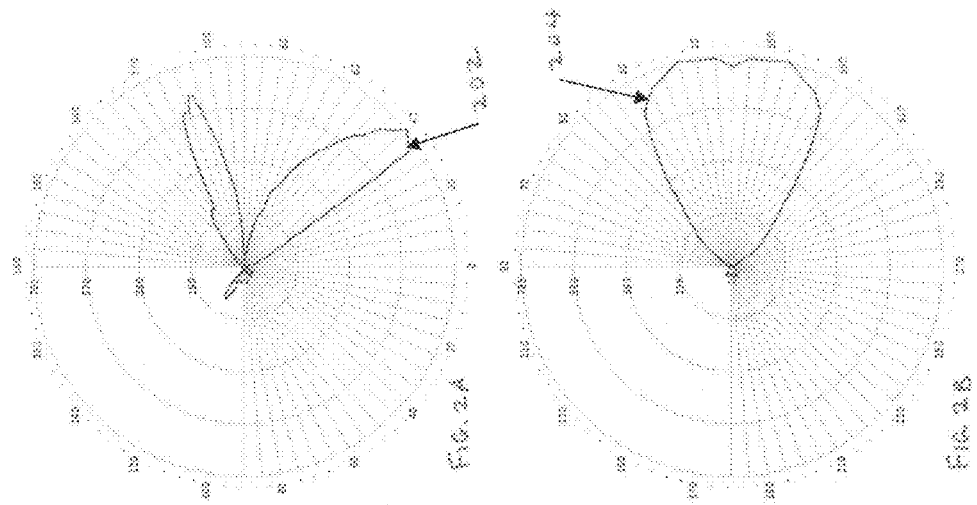
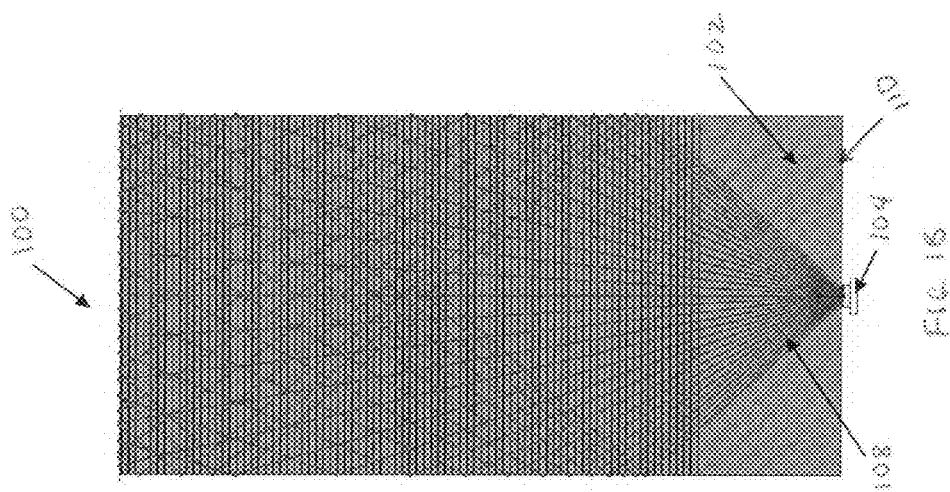
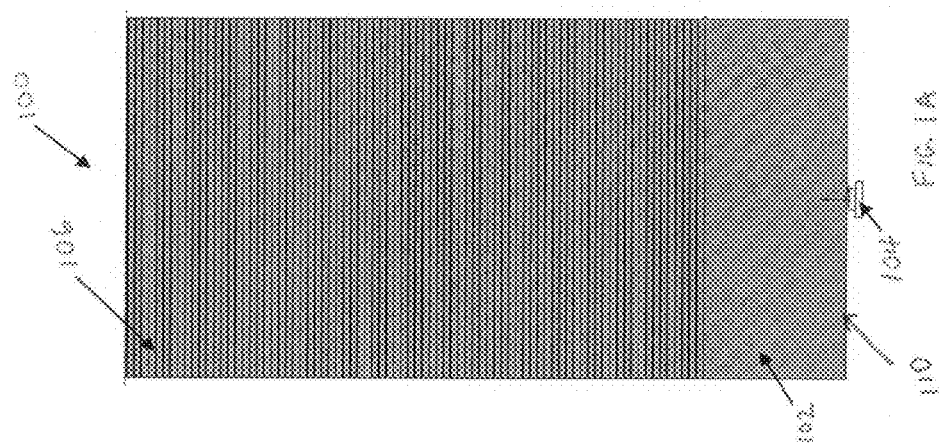

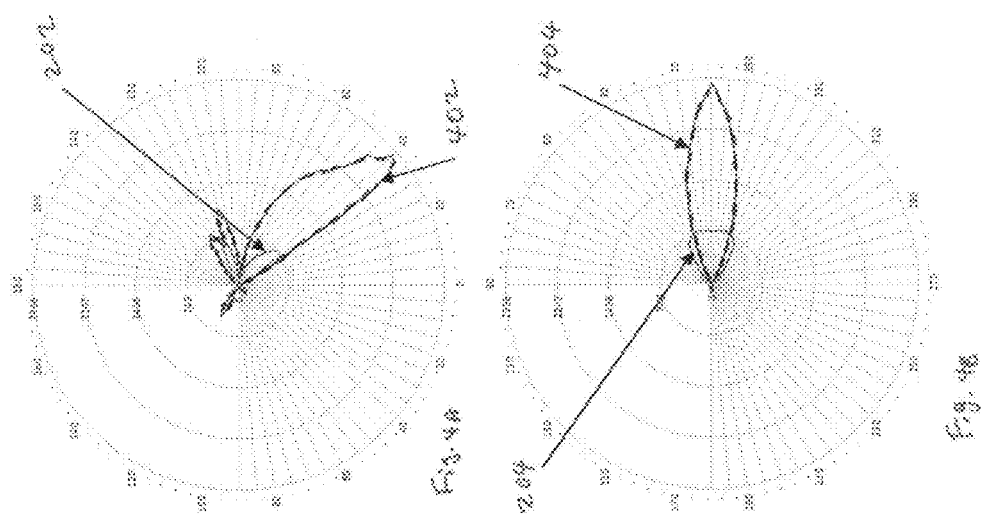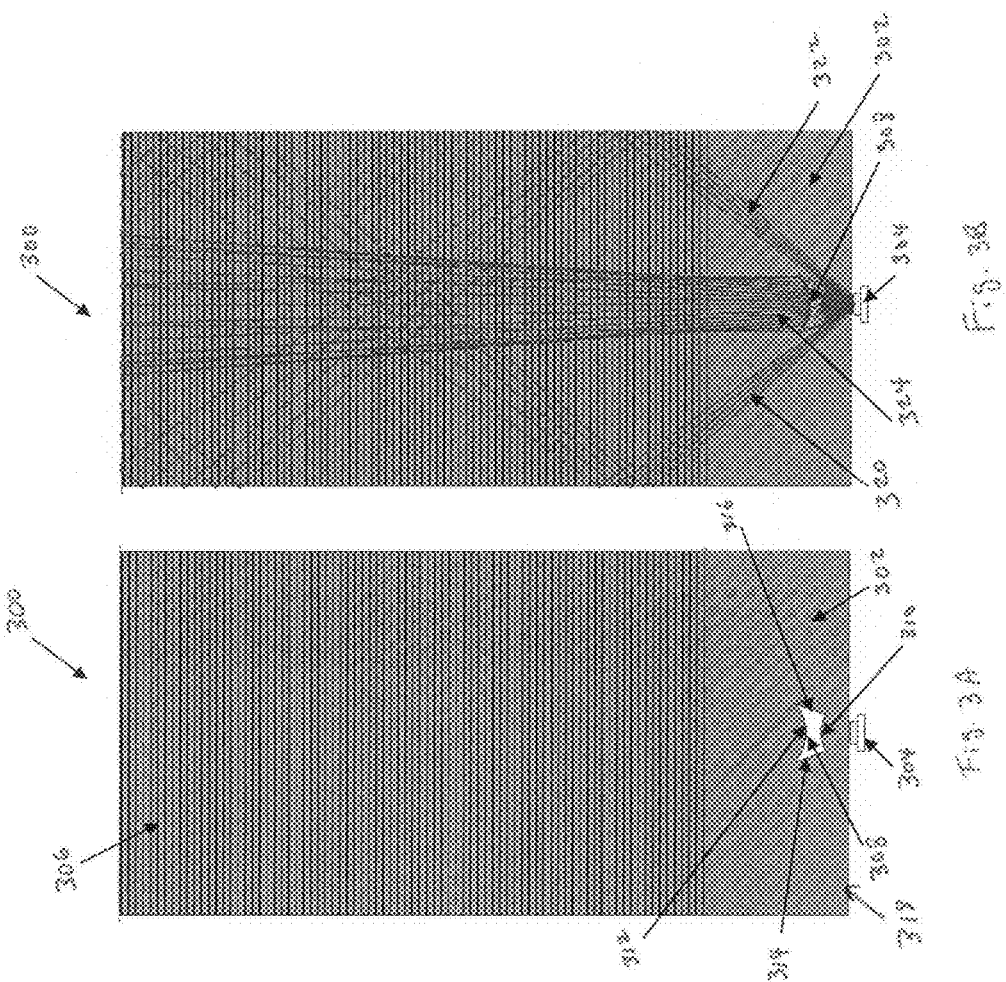

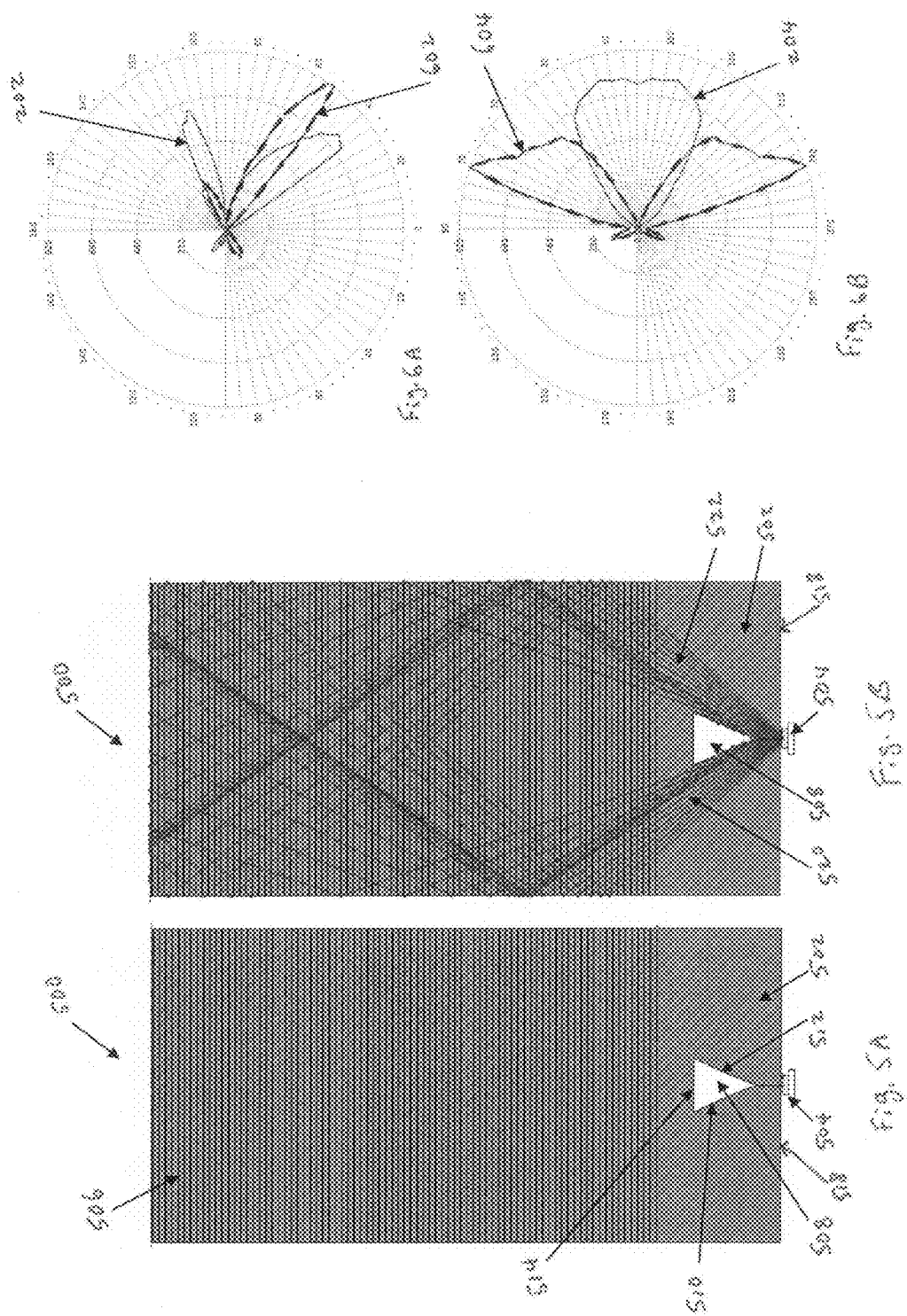

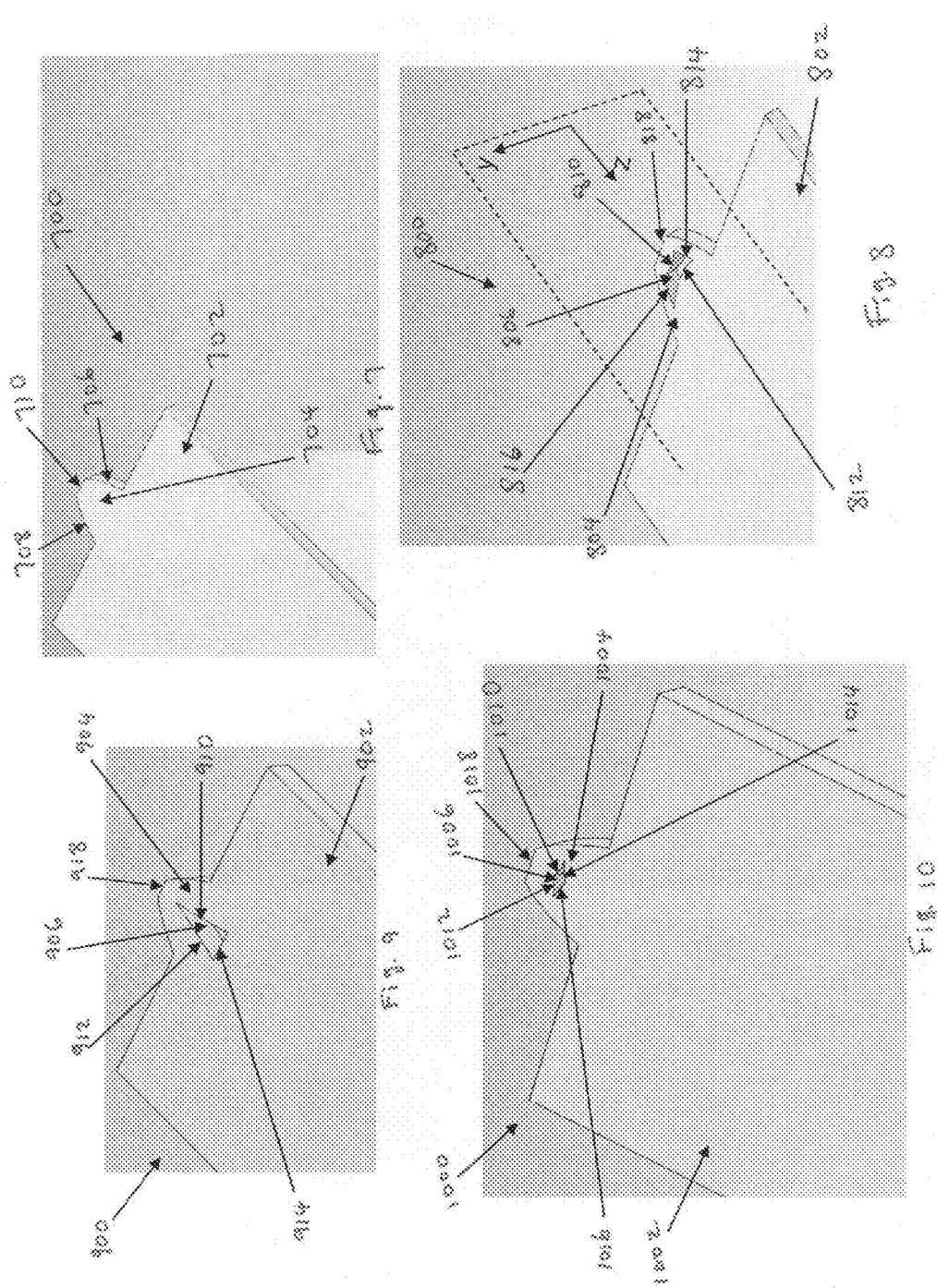

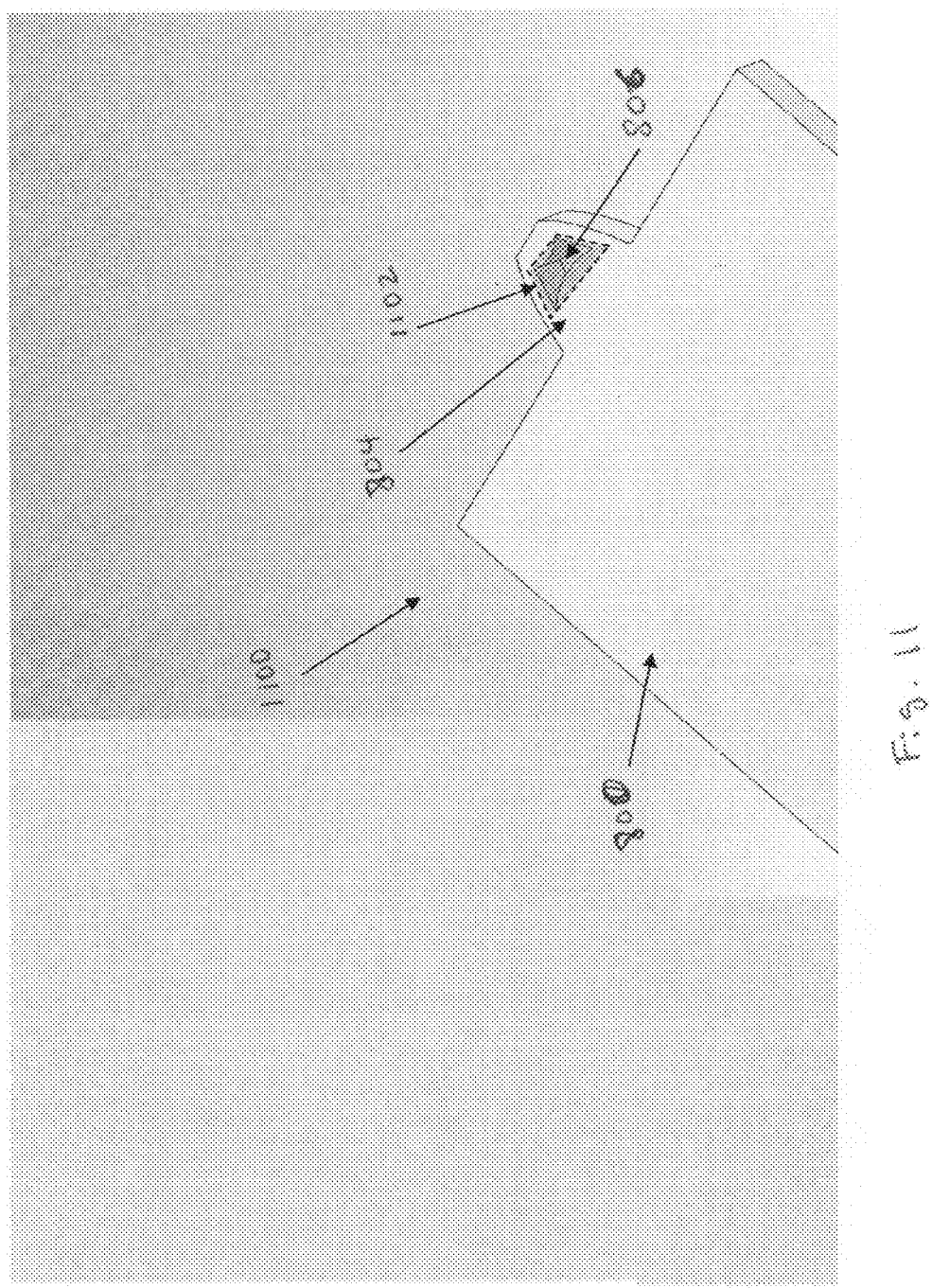

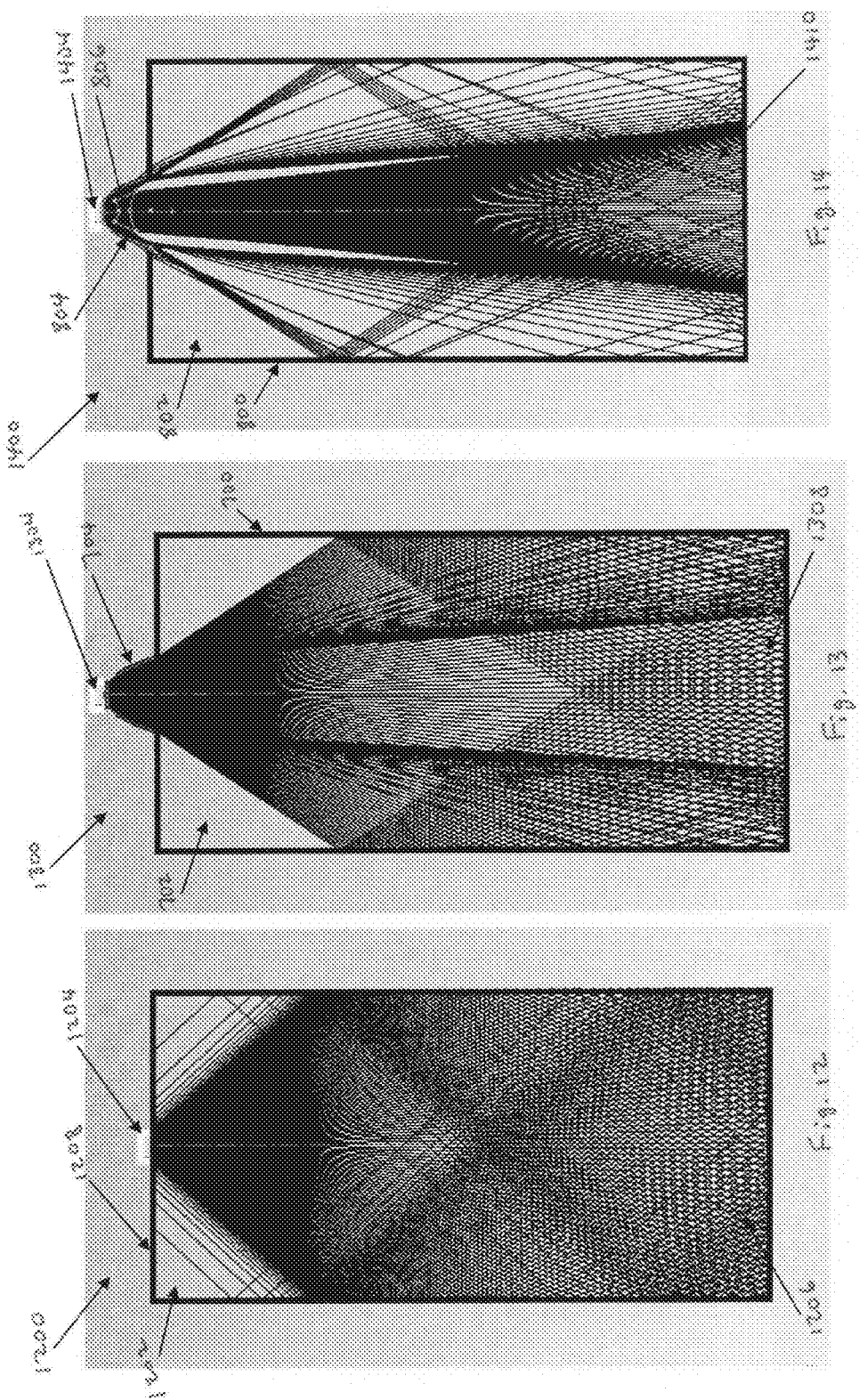

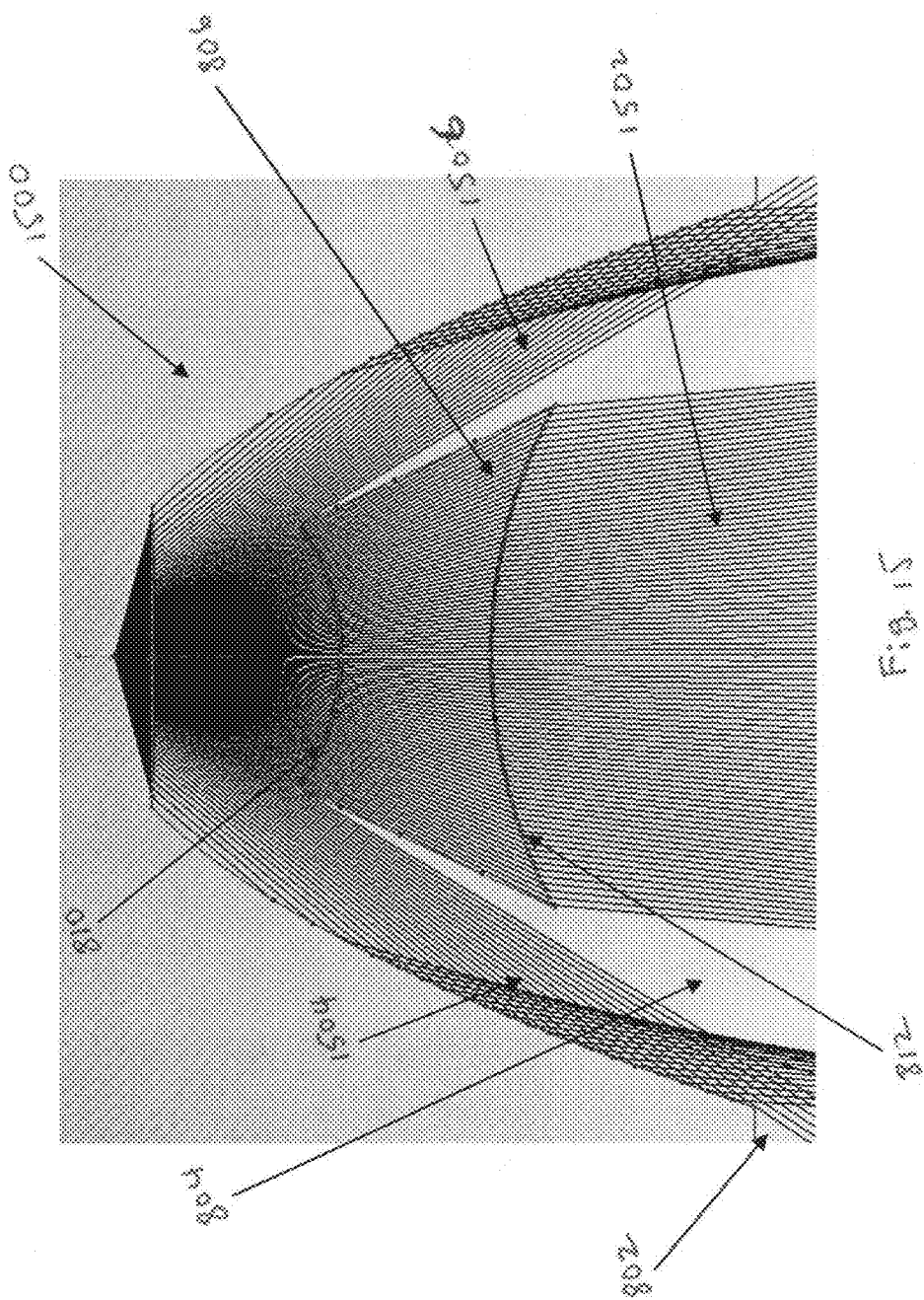

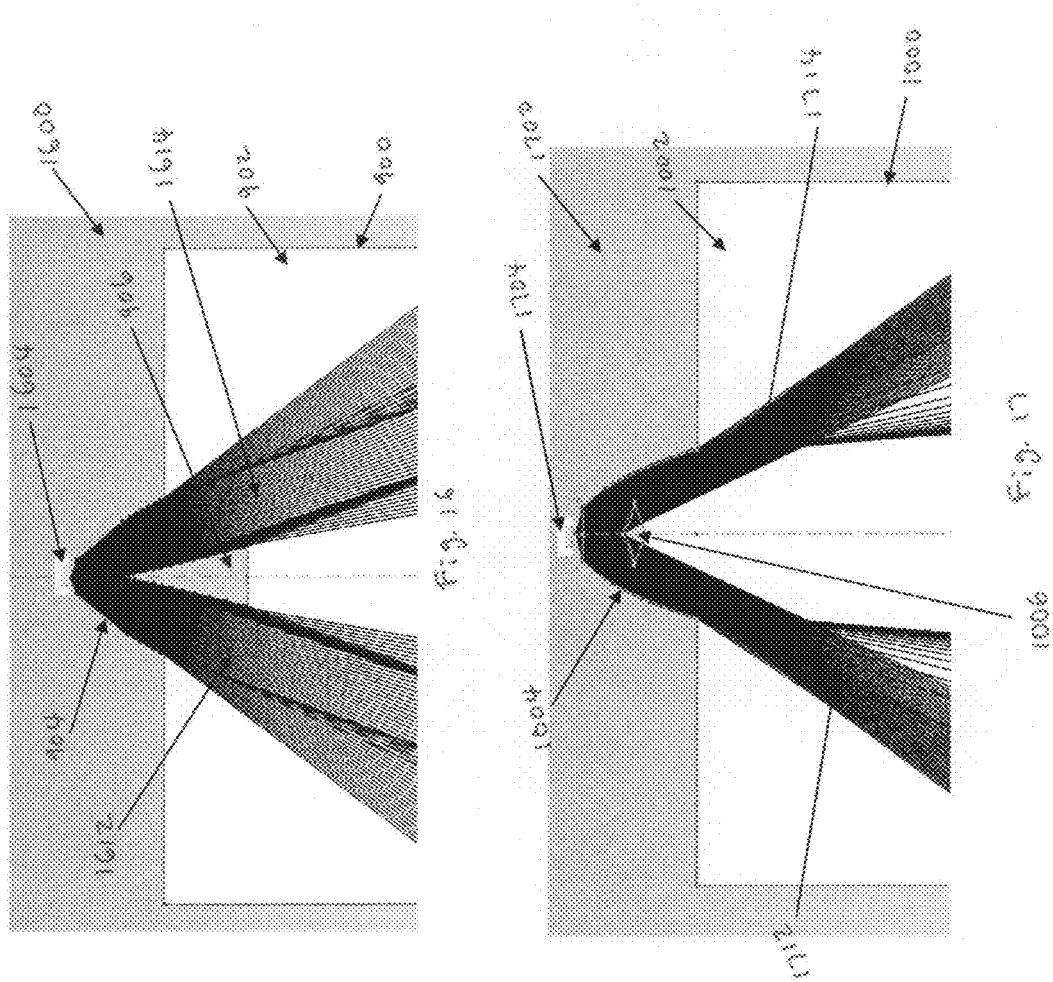

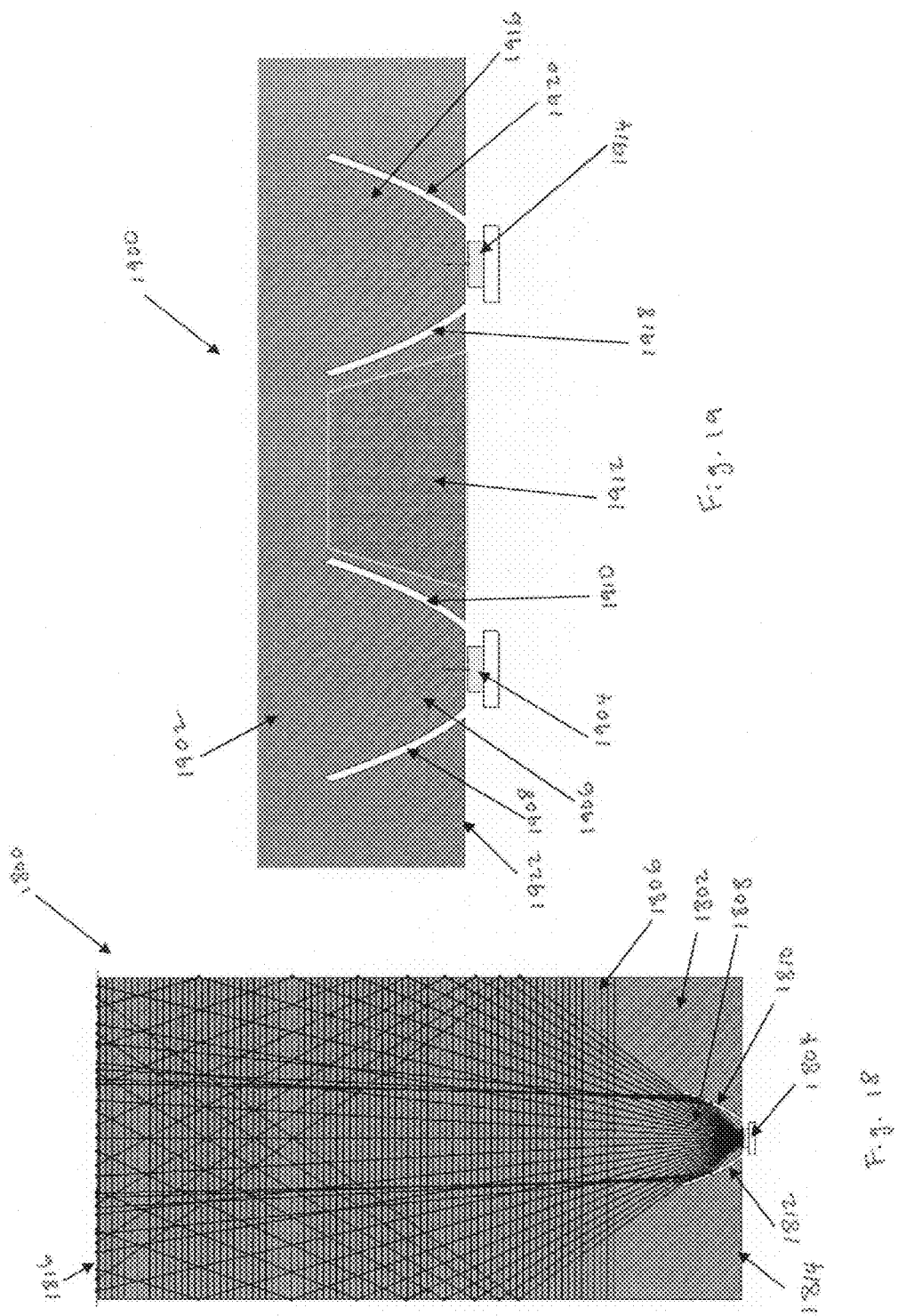

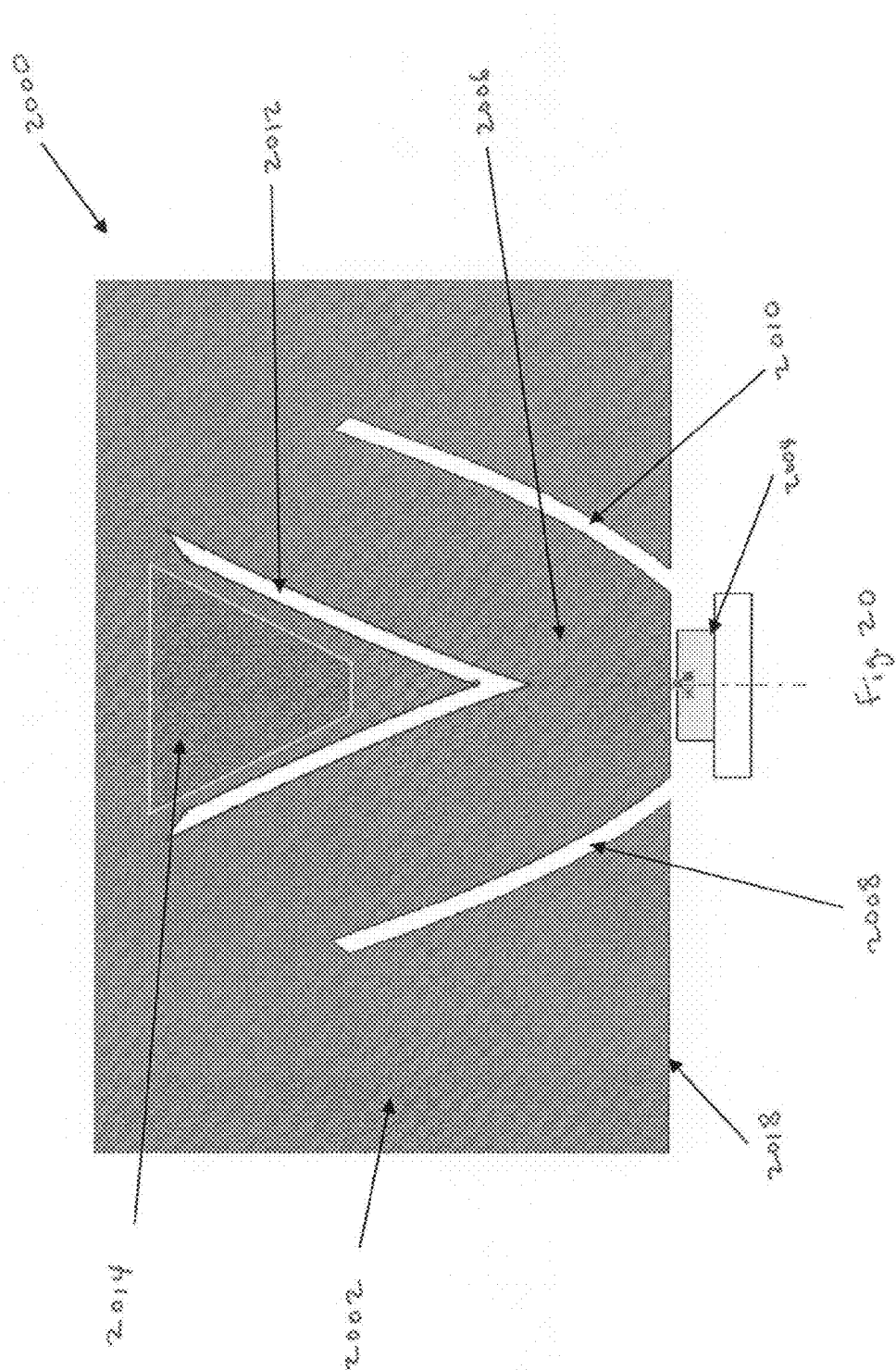

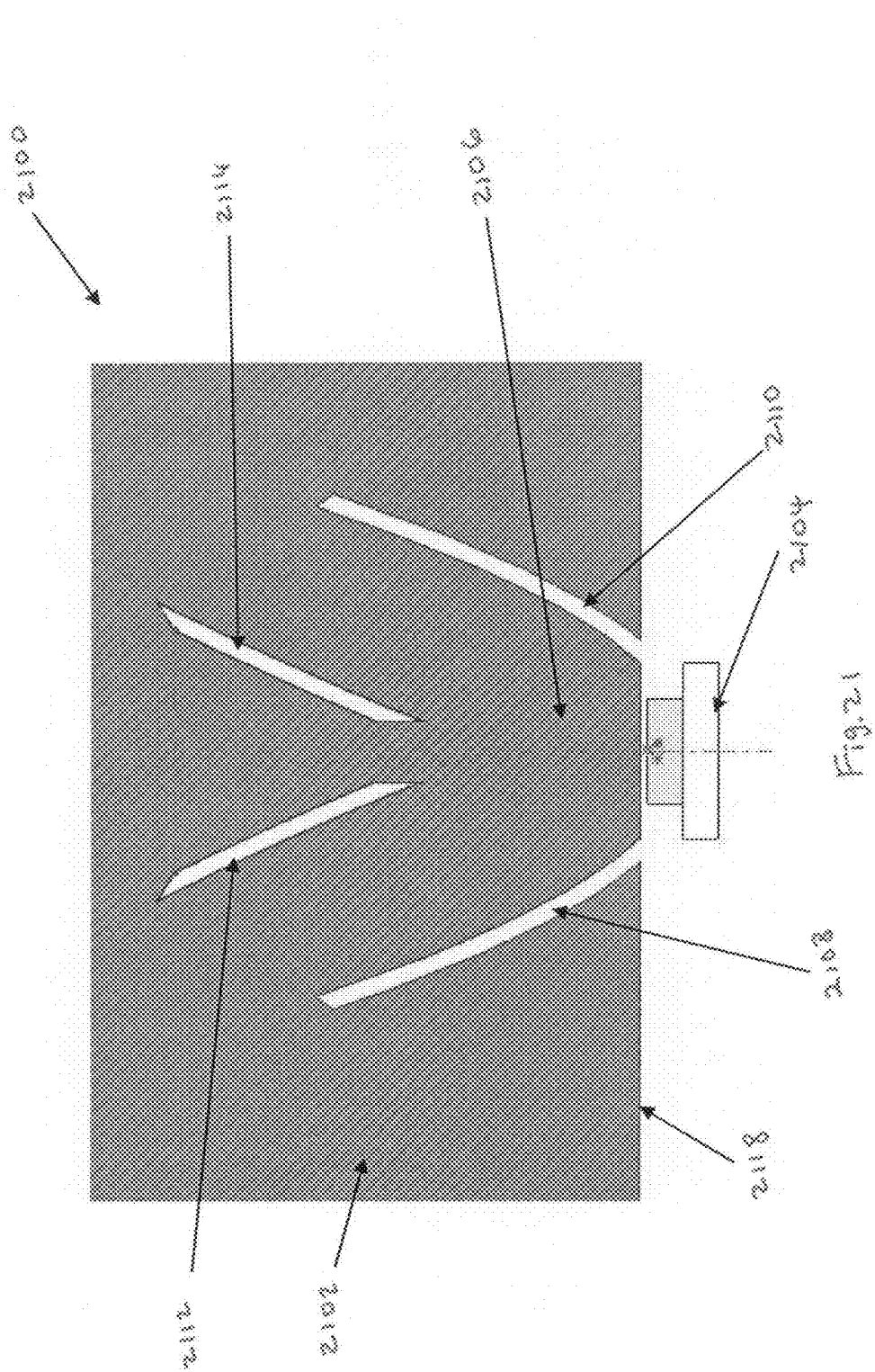

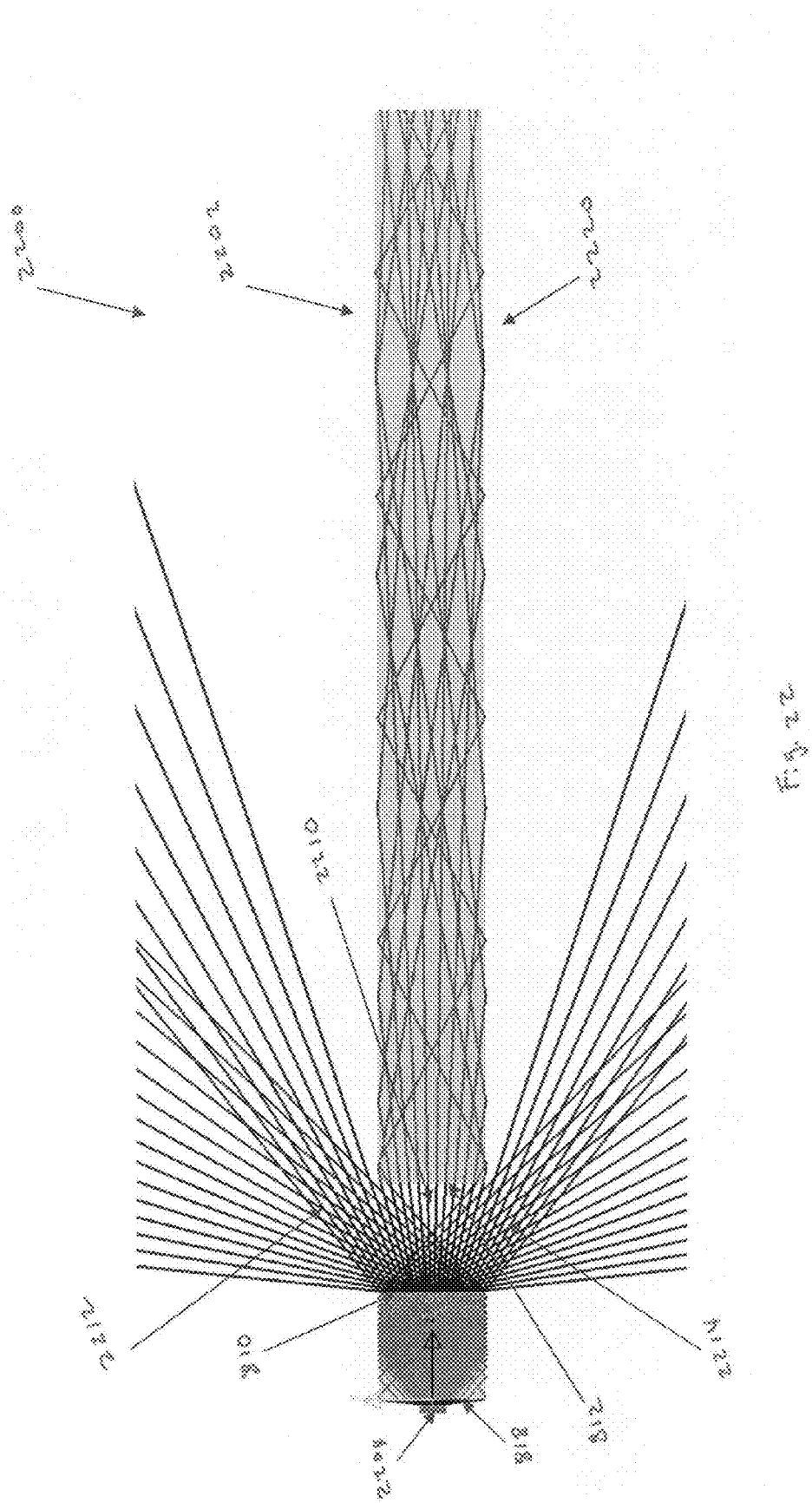

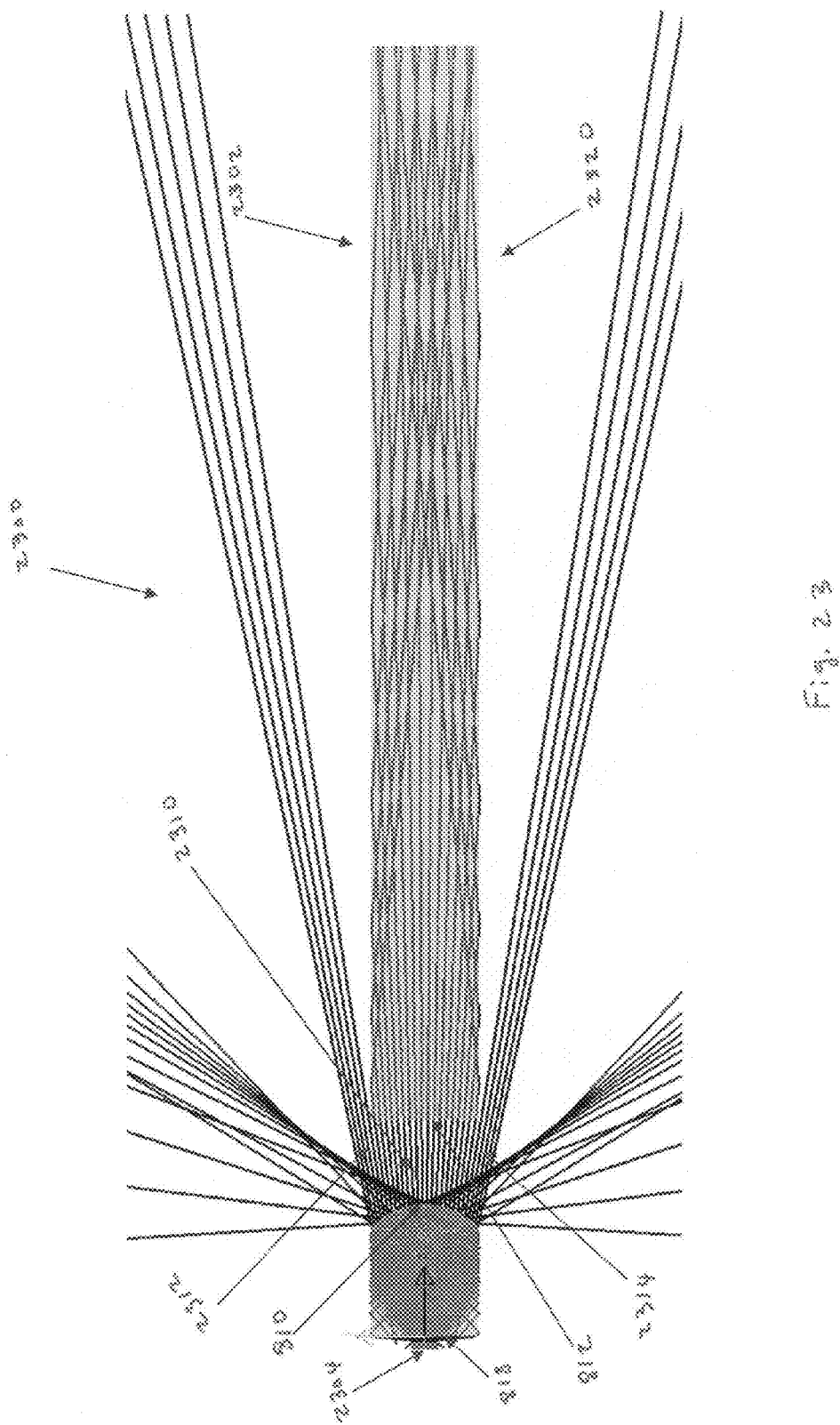

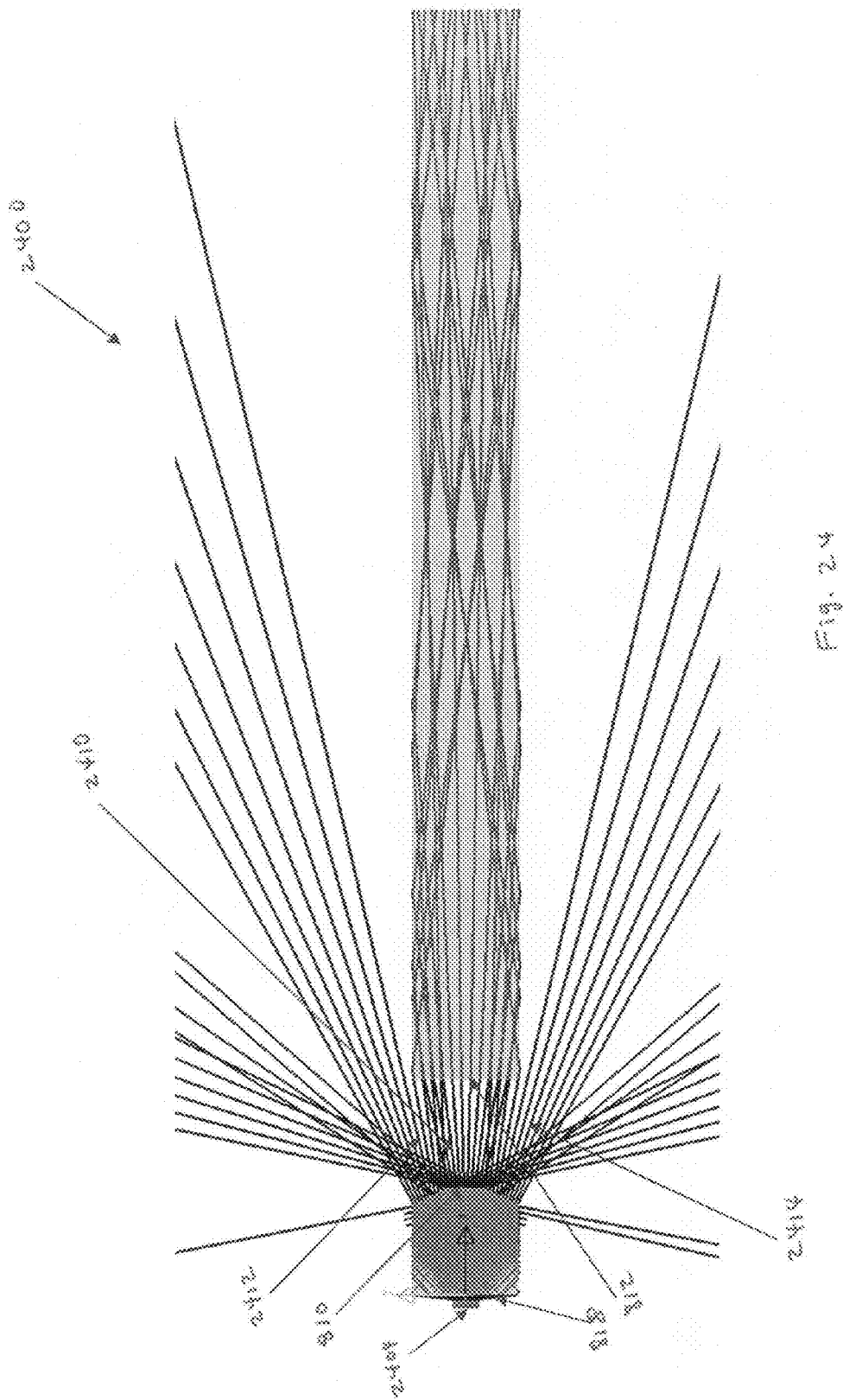

US 8,911,132 B1

EDGELIT OPTIC ENTRANCE FEATURES

TECHNICAL FIELD

The present disclosure relates generally to edge lighting, in particular to optically controlling edge light transferred from a light source to a light emitting panel.

BACKGROUND

Light from a light source may enter a light emitting panel (LEP) (also commonly referred to as a light guide) through a narrow side of the LEP and may be emitted by the LEP through a broad side of the LEP. For example, a lighting fixture may include a light source that is positioned close to a narrow side of an LEP. Light emitted by the LED may enter the LEP through the narrow side of the LEP. The LEP may illuminate a space around the LEP by emitting the light from the light source through one or more light emitting sides (broad sides) of the LEP. Light rays of the light from the light source that enter the LEP may travel in the LEP in various directions based on factors such as the positioning of the light source relative to the narrow edge of the LEP and based on characteristics of the LEP material. The paths of the light rays within the LEP may affect the illumination characteristics of the LEP.

Accordingly, optically controlling the light from the LED by directing the light rays within the LEP may enable adjustment of the illumination characteristics of the LEP. For example, a desirable illumination intensity and/or illumination pattern may be achieved by manipulating the illumination characteristics of the LEP.

SUMMARY

In general, the present disclosure relates to edge lighting and optically controlling edge light transferred from a light source to a light emitting panel. In an example embodiment, an LEP includes a first LEP side configured to emit light. The LEP also includes a second LEP side. The first LEP side and the second LEP side are opposite sides of the LEP. The LEP further includes a cutout area providing an air gap in the LEP through the first LEP side and the second LEP side. The LEP also includes a light receiving side. The cutout area is proximal to the light receiving side, and the light receiving side is configured to pass light through towards the cutout area.

In another example embodiment, the LEP includes a main panel and a protrusion extending out from the main panel. The protrusion has a light receiving side. The LEP also includes a cutout area proximal to the light receiving side. The cutout area provides an air gap in the LEP through a first side of the LEP configured to emit light and through a second side of the LEP. The first side of the LEP and the second side of the LEP are opposite sides of the LEP. The light receiving side of the protrusion is configured to pass light through towards the cutout area, and the protrusion is configured to collimate the light.

In another example embodiment, the LEP includes a first LEP side configured to emit light. The LEP also includes a second LEP side. The first LEP side and the second LEP side are opposite sides of the LEP. The LEP also includes a light receiving side configured to pass the light through for emitting by the LEP. The LEP further includes a light entrance area. The light entrance area has a first curved side bordering a first air gap in the LEP and a second curved side bordering a second air gap in the LEP. The first air gap and the second air gap extend inwards from the light receiving side and away from each other. Each of the first air gap and the second air gap extends through the first LEP side and the second LEP side.

These and other aspects, objects, features, and embodiments will be apparent from the following description and the appended claims.

BRIEF DESCRIPTION OF THE DRAWINGS

Reference will now be made to the accompanying figures, which are not necessarily to scale, and wherein:

FIGS. 1A and 1B illustrate an example embodiment of a lighting fixture including a light emitting panel (LEP);

FIGS. 2A and 2B illustrate luminous intensity plots of light emitted by the LEP of FIG. 1B;

FIGS. 3A and 3B illustrate an example embodiment of a lighting fixture including an LEP with a light collimating cutout area;

FIGS. 4A and 4B illustrate luminous intensity plots of light emitted by the LEP of FIG. 1B and light emitted by the LEP of FIG. 3B;

FIGS. 5A and 5B illustrate an example embodiment of a lighting fixture including an LEP with a light diverging cutout area;

FIGS. 6A and 6B illustrate luminous intensity plots of light emitted by the LEP of FIG. 1B and light emitted by the LEP of FIG. 5B;

FIG. 7 is a partial view of an example embodiment of an LEP having a parabolic protrusion;

FIG. 8 is a partial view of an example embodiment of an LEP having a parabolic protrusion including a light collimating cutout area;

FIG. 9 is a partial view of another example embodiment of an LEP having a parabolic protrusion including a light diverging cutout area;

FIG. 10 is a partial view of another example embodiment of an LEP having a parabolic protrusion including a light diverging cutout area;

FIG. 11 is an example embodiment of the LEP of FIG. 8 including a light collimating cutout area covered by a reflector;

FIG. 12 is an illustrative example of light distribution in an LEP of a lighting fixture;

FIG. 13 is an illustrative example of light distribution in the LEP of FIG. 7;

FIG. 14 is an illustrative example of light distribution in the LEP of FIG. 8;

FIG. 15 is a close-up view of the light distribution in the LEP of the lighting fixture of FIG. 14, near the parabolic protrusion and the light collimating cutout area of the LEP of FIGS. 8 and 14;

FIG. 16 is an illustrative example of light distribution in the LEP of FIG. 9;

FIG. 17 is an illustrative example of light distribution in the LEP of FIG. 10;

FIG. 18 is an example embodiment of a lighting fixture including an LEP having a parabolic area partially bounded by air gaps in the LEP;

FIG. 19 is a partial view of an example embodiment of a lighting fixture including an LEP having two parabolic areas that are each partially bounded by air gaps in the LEP;

FIG. 20 is an example embodiment of a lighting fixture including an LEP that has a parabolic area partially bounded by air gaps in the LEP;

FIG. 21 is another example embodiment of a lighting fixture including an LEP that has a parabolic area partially bounded by air gaps in the LEP;

FIG. 22 illustrates an example cross sectional view of light distribution in the y-z plane shown in FIG. 8;

FIG. 23 illustrates another example of a cross sectional view of light distribution in the y-z plane shown in FIG. 8; and FIG. 24 illustrates another example of a cross sectional view of light distribution in the y-z plane shown in FIG. 8.

The figures illustrate only example embodiments and are therefore not to be considered limiting in scope. The elements and features shown in the figures are not necessarily to scale, emphasis instead being placed upon clearly illustrating the principles of the example embodiments. Additionally, certain dimensions or placements may be exaggerated to help visually convey such principles. In the figures, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the figures, particular embodiments are described. FIGS. 1A and 1B illustrate an example embodiment of a lighting fixture 100 including a light emitting panel (LEP) 102. The lighting fixture 100 also includes a light source 104 (e.g., an LED) adjacent to the LEP 302. The LEP 102 further includes grooves 106 on a light emitting side (front side) of the LEP 102. The LEP 102 includes a light receiving side 110 that allows light from the light source 104 to enter the LEP as illustrated in FIG. 1B. Some light rays 108 of the light from the light source 104 may travel through the LEP 102 in different directions illustrated in FIG. 1B. The LEP 102 may emit a portion of the light from the light source 104 through the light emitting side having the grooves 106. The LEP 102 may also emit a portion of the light from the light source 104 through a back side of the LEP 102. The back side of the LEP 102 is the side of the LEP opposite of the light emitting side having the grooves 106. In a particular embodiment, the LEP 102 may also include grooves on the back side of the LEP 102.

FIGS. 2A and 2B illustrate luminous intensity plots of light emitted by the LEP 102 of FIG. 1B. FIG. 2A illustrates a vertical plane luminous intensity curve 202 of light emitted by the LEP 102. The "vertical plane" corresponds to a plane that is perpendicular to the front side of the LEP 102 and passes through the front and the back sides of the LEP 102 (as if to cut through the page). The angle values in FIG. 2A correspond to angle values in the vertical plane relative to the light source 104. FIG. 2B illustrates a luminous intensity curve 204 of light emitted by the LEP 102 in a horizontal cone. The "horizontal cone" corresponds to a cone cutting through a vertical angle at which maximum intensity occurs. The angle values in FIG. 2B correspond to different positions on the parallel plane relative to the light source 104 of FIGS. 1A and 1B.

FIGS. 3A and 3B illustrate an example embodiment of a lighting fixture 300 including an LEP 302 having a light collimating cutout area 308. The lighting fixture 300 also includes a light source 304 (e.g., an LED) adjacent to the LEP 302. The LEP 302 further includes grooves 306 on a light emitting side of the LEP 302. In a particular embodiment, the LEP 302 may be made from an acrylic material. The LEP 302 also has a light receiving side 318 that allows light from the light source 304 to enter the LEP 302, as illustrated in FIG. 3B. In a particular embodiment, the lighting fixture 300 corresponds to the lighting fixture 100 of FIGS. 1A and 1B without the light collimating cutout area 308.

In a particular embodiment, the LEP 302 includes the light collimating cutout area 308 positioned close to the light source 304. The light collimating cutout area 308 provides an air gap (i.e., a passageway) in the LEP 302. The air gap extends through the light emitting side having the grooves 306 and through a back side of the LEP 302. The back side of the LEP 302 is the side (facing the page) of the LEP 302 opposite the light emitting side of the LEP 302 having the grooves 306.

In a particular embodiment, the light collimating cutout area 308 includes a first side 310 and a second side 312 across from the first side 310. The light collimating cutout area 308 also includes a third side 314 extending between the first side 310 and the second side 312. The light collimating cutout area 308 further includes a fourth side 316 across from the third side 314 and extends between the first side 310 and the second side 312. As illustrated in FIGS. 3A and 3B, the second side 312 is longer than the first side 310.

In a particular embodiment, the first side 310 has a surface that is curved towards the second side 312 between the third side 314 and the fourth side 316. The second side 312 also has a surface that is curved towards the first side 310 between the third side 314 and the fourth side 316. The surface of the first side 310 and the surface of the second side 312 may have smaller or larger radius than illustrated in FIGS. 3A and 3B.

In a particular embodiment, the first side 310 may have a surface that is substantially flat between the light emitting side of the LEP 302 having the grooves 306 and the back side of the LEP 300, as explained with respect to FIG. 22. In alternative embodiments, the first side 310 may have a surface that is curved towards the second side 312, light emitting side of the LEP 302 having the grooves 306 and the back side of the LEP 300, as explained further with respect to FIG. 23. In other alternative embodiments, the first side 310 may have a multi-faceted surface bulging towards the second side 312 between the light emitting side of the LEP 302 having the grooves 306 and the back side of the LEP 302, as explained with respect to FIG. 24.

In a particular embodiment, the light collimating cutout area 308 is configured to collimate the light from the light source 304 that enters the LEP 302 through the light receiving side 318. As illustrated in FIG. 3B, the light from the light source 304 includes light rays 320, 322, 324. The light rays 320 of the light from the light source 304 and the light rays 322 of the light from the light source 304 travel through the LEP 302 without entering the light collimating cutout area 308. The light rays 320 of the light from the light source 304 may travel through the LEP 302 on one side of the light collimating cutout area 308, and the light rays 322 of the light from the light source 104 may travel through the LEP 302 on another side of the light collimating cutout area 308.

In a particular embodiment, the light rays 324 of the light from the light source 304 may pass through the light collimating cutout area 308. To illustrate, the light rays 324 may enter the light collimating cutout area 308 through the first side 310 and leave the light collimating cutout area 308 through the second side 312. The light collimating cutout area 308 may collimate the light rays 324 as the light rays 324 pass through the light collimating cutout area 308 as illustrated in FIG. 3B. The proportion of the light rays 324 to the light rays 320 and 322 may depend on proximity of the light collimating cutout area 308 to the light receiving side and the light source 304. The proportion of the light rays 324 to the light rays 320 and 322 may also depend on alignment of the light collimating cutout area 308 with the light receiving side and the light source 304.

In a particular embodiment, the LEP 302 may emit a portion of the light from the light source 304 through the light emitting side having the grooves 306. The LEP 302 may also emit another portion of the light from the light source 304 through the back side of the LEP 302. In a particular embodiment, the LEP 302 may also include grooves on the back side of the LEP.

As explained below with respect to FIG. 11, in a particular embodiment, reflectors may sandwich the light collimating cutout area 308 on both the light emitting side of the LEP 302 having the grooves 306 and the back side of the LEP 302 to keep light from escaping out through the air gap of the light collimating cutout area 308. For example, high reflectance specular reflectors, such as an aluminum reflector, may be used to sandwich the light collimating cutout area 308.

Although FIGS. 3A and 3B illustrate the LEP 302 having grooves 306, in alternative embodiments, the LEP 302 may not have any grooves or may have fewer grooves than shown in FIGS. 3A and 3B. Further, although the LEP 302 is shown as having a substantially rectangular outer perimeter, in other embodiments, the outer perimeter of the LEP 302 may have other shapes. Furthermore, the light collimating cutout area 308 may be smaller or larger than illustrated in FIGS. 3A and 3B. The light collimating cutout area 308 may also have a different shape than the shape illustrated in FIGS. 3A and 3B and still collimate the light from the light source 304. For example, one or both of the third side 314 and the fourth side 316 of the light collimating cutout area 308 may be curved. In alternative embodiments, the light collimating cutout area 308 may also be closer to or farther from the light receiving side 318 than illustrated in FIGS. 3A and 3B. In a particular embodiment, the collimating effect of the light collimating cutout area 308 may depend on the radius of the curvature of the first side 310.

FIGS. 4A and 4B illustrate luminous intensity plots of light emitted by the LEP 102 of FIG. 1B and light emitted by the LEP 302 of FIG. 3B. FIG. 4A illustrates an overlap of a vertical plane luminous intensity curve 202 of light emitted by the LEP 102 of FIG. 1B and a vertical plane luminous intensity curve 402 of light emitted by the LEP 302 of FIG. 3B. FIG. 4B illustrates an overlap of a horizontal cone luminous intensity curve 204 of light emitted by the LEP 102 of FIG. 1B and a horizontal cone luminous intensity curve 404 of light emitted by the LEP 302 of FIG. 3B. Comparison of the vertical plane luminous intensity curves 202 and 402 illustrates the higher luminous intensity achieved by the lighting fixture 300 of FIG. 3 relative to the lighting fixture 100 of FIG. 1. Similarly, comparison of the horizontal cone luminous intensity curves 204 and 404 illustrates the higher luminous intensity and the narrower radial light distribution achieved by the lighting fixture 300 of FIG. 3 relative to the lighting fixture 100 of FIG. 1.

FIGS. 5A and 5B illustrate an example embodiment of a lighting fixture 500 including an LEP 502 having a light diverging cutout area 508. The lighting fixture 500 also includes a light source 504 (e.g., an LED) adjacent to the LEP 502. The LEP 502 further includes grooves 506 on a light emitting side of the LEP 502. In a particular embodiment, the LEP 502 may be made from an acrylic material. The LEP 502 also has a light receiving side 518 that allows light from the light source 304 to enter the LEP 302, as illustrated in FIG. 5B. In a particular embodiment, except for the light diverging cutout area 508, the lighting fixture 500 corresponds to the lighting fixture 100 of FIGS. 1A and 1B.

In a particular embodiment, the LEP 502 includes the light diverging cutout area 508 positioned close to the light source 504. The light diverging cutout area 508 provides an air gap (i.e., a passageway) in the LEP 502. The air gap extends through the light emitting side having the grooves 506 and through a back side of the LEP 502. The back side of the LEP 502 is the side (facing the page) of the LEP 502 opposite the light emitting side of the LEP 502 having the grooves 506.

In a particular embodiment, the light diverging cutout area 508 includes a first side 510 and a second side 512 that form a substantially V-shaped perimeter of the light diverging cutout area 508. The light diverging cutout area 508 also includes a third side 514 extending between the first side 510 and the second side 512.

In a particular embodiment, the first side 510, the second side 512, and the third side 514 have substantially flat surfaces. In alternative embodiments, one or more of the first side 510, the second side 512, and the third side 514 may have a curved surface.

In a particular embodiment, the light diverging cutout area 508 is configured to diverge light from the light source 504 that enter the LEP 502 through the light receiving side 518 around the light diverging area 508. The light diverging cutout area 508 functions as a total internal reflection (TIR) reflector to reflect the light from the light source 504 that is directed through the LEP 502 towards the light diverging cutout area 508.

As illustrated in FIG. 5B, the light from the light source 504 includes light rays 520 and 522. The light diverging cutout area 508 directs the light rays 520 around the first side 510 of the light diverging cutout area 508. Similarly, the light diverging cutout area 508 directs the light rays 522 around the second side 512 of the light diverging cutout area 508. The light rays 520 of the light from the light source 504 and the light rays 522 of the light from the light source 104 travel through the LEP 502 without entering the light diverging cutout area 508.

In a particular embodiment, the LEP 502 may emit a portion of the light from the light source 504 through the light emitting side having the grooves 506. The LEP 502 may also emit another portion of the light from the light source 504 through the back side of the LEP 502. In a particular embodiment, the LEP 502 may also include grooves on the back side of the LEP.

Although FIGS. 5A and 5B illustrate the LEP 502 having grooves 506, in alternative embodiments, the LEP 502 may have fewer grooves or alternate patterns of optical features than those shown in FIGS. 5A and 5B. Further, although the LEP 502 is shown as having a substantially rectangular outer perimeter, in other embodiments, the outer perimeter of the LEP 502 may have other shapes. Furthermore, the light diverging cutout area 508 may be smaller or larger than illustrated in FIGS. 5A and 5B. The light diverging cutout area 508 may also have a shape different from the shape illustrated in FIGS. 5A and 5B and still diverge the light from the light source 504. For example, the light diverging cutout area 508 may have two or more sides instead of the third side 514. In alternative embodiments, the light diverging cutout area 508 may also be closer to or farther from the light receiving side 518 than illustrated in FIGS. 5A and 5B.

FIGS. 6A and 6B illustrate luminous intensity plots of light emitted by the LEP 102 of FIG. 1B and light emitted by the LEP 502 of FIG. 5B. FIG. 6A illustrates an overlap of a vertical plane luminous intensity curve 202 of light emitted by the LEP 102 of FIG. 1B and a vertical plane luminous intensity curve 402 of light emitted by the LEP 502 of FIG. 5B. FIG. 4B illustrates an overlap of a horizontal cone luminous intensity curve 204 of light emitted by the LEP 102 of FIG. 1B and a horizontal cone luminous intensity curve 604 of light emitted by the LEP 502 of FIG. 5B. Comparison of the vertical plane luminous intensity curves 202 and 602 illustrates a particular angle higher luminous intensity achieved by the lighting fixture 500 of FIG. 5 relative to the lighting fixture 100 of FIG. 1. Comparison of the horizontal cone luminous intensity curves 204 and 604 illustrates the higher luminous intensity and the diverging radial light distribution achieved by the lighting fixture 500 of FIG. 5 relative to the lighting fixture 100 of FIG. 1.

FIG. 7 is a partial view of an example embodiment of an LEP 700 having a parabolic protrusion 704. The LEP 700 also includes a main panel 702. The parabolic protrusion 704 extends out from the main panel 702. In a particular embodiment, the parabolic protrusion 704 has a first curved side 706, a second curved side 708, and a light receiving side 710 between the first curved side 706 and the second curved side 708. As illustrated in FIG. 7, the first curved side 706 and the second curved side 708 extend out from the main panel 702 towards each other. In a particular embodiment, the light receiving side 710 may have a substantially flat surface between the first curved side 706 and the second curved side 708. The LEP 702 has a front side and a back side (facing the page) that is opposite the front side. One or both of the front side and the back side that may emit light received through the light receiving side 710. One or both of the front side and the back side of the LEP 700 may also have grooves similar to the grooves 106 of FIG. 1A. The parabolic protrusion 704 has a collimating effect on light that enters the LEP 704 through the light receiving side 710. An illustrative light ray distribution in the LEP 700 is shown in FIG. 13.

FIG. 8 is a partial view of another example embodiment of an LEP 800 having a parabolic protrusion 804. The LEP 800 includes a main panel 802 and a light collimating cutout area 806. The LEP 800 also has a front side and a back side (facing the page) that is opposite the front side. One or both of the first side and the back side of the LEP 800 may emit light received through the light receiving side 818 of the parabolic protrusion 804. The parabolic protrusion 804 extends out from the main panel 802. In a particular embodiment, except for the light collimating cutout area 806, the parabolic protrusion 804 corresponds to the parabolic protrusion 704 of FIG. 7. For example, the parabolic protrusion 804 has a first curved side, a second curved side, and a light receiving side 818 between the first curved side and the second curved side as the parabolic protrusion 704 of FIG. 7.

In a particular embodiment, the light collimating cutout area 806 is positioned on the parabolic protrusion 804 close to the light receiving side 818. The light collimating cutout area 806 provides an air gap (i.e., a passageway) in the LEP 800. The air gap extends through a front side of the LEP 800 and through the back side of the LEP 800. As indicated above, the front side of the LEP 800 and the back side of the LEP 800 are opposite sides of the LEP 800. The light receiving side 818 of the parabolic protrusion 804 may pass light through towards the light collimating cutout area 806.

In a particular embodiment, the light collimating cutout area 806 includes a first side 810 and a second side 812 across from the first side 810. The light collimating cutout area 806 also includes a third side 814 extending between the first side 810 and the second side 812. The light collimating cutout area 806 further includes a fourth side 816 across from the third side 814 and extends between the first side 810 and the second side 812. As illustrated in FIG. 8, the second side 812 is longer than the first side 810.

In a particular embodiment, the first side 810 has a surface that is curved towards the second side 812 between the third side 814 and the fourth side 816. The second side 812 also has a surface that is curved towards the first side 810 between the third side 814 and the fourth side 816. Curvatures of the surface of the first side 810 and the surface of the second side 812 may have smaller or larger radius than illustrated in FIG. 8.

In a particular embodiment, the first side 810 may have a surface that is substantially flat between the front of the LEP 802 and the back side of the LEP 800, as explained with respect to FIG. 22. In alternative embodiments, the first side 810 may have a surface that is curved towards the second side 812 between the front side of the LEP 800 and the back side of the LEP 800, as explained further with respect to FIG. 23. In other alternative embodiments, the first side 810 may have a multi-faceted surface bulging towards the second side 812 between the front of the LEP 802 and the back side of the LEP 800, as explained with respect to FIG. 24.

In a particular embodiment, the light collimating cutout area 806 is configured to collimate light (for example, light from an LED positioned adjacent to the light receiving side 818 of the parabolic protrusion 804) that enters the LEP 800 through the light receiving side 818 of the parabolic protrusion 804. An illustrative distribution of light rays of light in the LEP 800 is shown in FIGS. 14 and 15.

Although FIG. 8 shows the light collimating cutout area 806 positioned entirely on the parabolic protrusion 804, in alternative embodiment, the light collimating cutout area 806 may be partially positioned on the parabolic protrusion and partially positioned on the main panel 802. In a particular embodiment, the light collimating cutout area 806 corresponds to the light collimating cutout area 308 of FIGS. 3A and 3B and collimates light in a manner described with respect to the light collimating cutout area 308. Further, alternative embodiments of the light collimating cutout area 308 described with respect to FIGS. 3A and 3B are applicable to the light collimating cutout area 806. For example, the light collimating cutout area 806 may be smaller or larger than illustrated in FIG. 8. The light collimating cutout area 806 may also have a shape different from the shape illustrated in FIG. 8 and still collimate the light from the light source 304. For example, one or both of the third side 814 and the fourth side 816 of the light collimating cutout area 806 may be curved. In a particular embodiment, the collimating effect of the light collimating cutout area 806 may depend on the radius of the curvature of the first side 810. Further, the main panel 802 may have outer perimeter shapes other than illustrated in FIG. 8. Furthermore, although FIG. 8 shows a single parabolic protrusion (the parabolic protrusion 804), in alternative embodiments, the LEP 800 may include one or more parabolic protrusions extending from the same side of the main panel 802 as the parabolic protrusion 804.

FIG. 9 is a partial view of another example embodiment of an LEP 900 having a parabolic protrusion 904. The LEP 900 includes a main panel 902 and a light diverging cutout area 906. The LEP 900 also has a front side and a back side (facing the page) that is opposite the front side. One or both of the first side and the back side of the LEP 900 may emit light received through the light receiving side 918 of the parabolic protrusion 904. The parabolic protrusion 904 extends out from the main panel 902. In a particular embodiment, except for the light diverging cutout area 906, the parabolic protrusion 904 corresponds to the parabolic protrusion 704 of FIG. 7. For example, the parabolic protrusion 904 of the LEP 900 has a first curved side, a second curved side, and a light receiving side 918 between the first curved side and the second curved side as the parabolic protrusion 704 of FIG. 7.

In a particular embodiment, the light diverging cutout area 906 is positioned on the parabolic protrusion 904 close to the light receiving side 918. The light diverging cutout area 906 provides an air gap (i.e., a passageway) in the LEP 900. The air gap extends through a front side of the LEP 900 and through the back side of the LEP 900. As indicated above, the front side of the LEP 900 and the back side of the LEP 900 are opposite sides of the LEP 900. The light receiving side 918 of the parabolic protrusion 904 may pass light through towards the light diverging cutout area 906.

In a particular embodiment, the light diverging cutout area 906 includes a first side 910 and a second side 912 that form a substantially V-shaped perimeter of the light diverging cutout area 906. The light diverging cutout area 906 also includes a third side 914 extending between the first side 910 and the second side 912. In a particular embodiment, the first side 910, the second side 912, and the third side 914 have substantially flat surfaces. In alternative embodiments, one or more of the first side 910, the second side 912, and the third side 914 may have a curved surface.

In a particular embodiment, the light diverging cutout area 906 is configured to diverge light (for example, light from an LED) around the light diverging cutout area 906. For example, the light diverging cutout area 906 may diverge light that enters the LEP 900 through the light receiving side 918 of the parabolic protrusion 904 and reaches the light diverging cutout area 906. The light diverging cutout area 906 may function as a total internal reflection (TIR) reflector to reflect the light that reaches the light diverging cutout area 906. Some light rays of the light that reach the light diverging cutout area 906 through the LEP 900 are diverged by the light diverging cutout area 906 and do not enter the light diverging cutout area 906. In a particular embodiment, the light diverging cutout area 906 corresponds to the light diverging cutout area 906 of FIGS. 5A and 5B and diverges light in a manner described with respect to the light diverging cutout area 906. An illustrative distribution of light rays of light in the LEP 900 is shown in FIG. 16.

Although FIG. 9 shows the light diverging cutout area 906 positioned partially on the parabolic protrusion 904 and partially on the main panel 902, in an alternative embodiment, the light diverging cutout area 906 may be positioned entirely on the parabolic protrusion. In a particular embodiment, the light diverging cutout area 906 corresponds to the light diverging cutout area 508 of FIGS. 5A and 5B and diverges light in a manner described with respect to the light diverging cutout area 508. Further, alternative embodiments of the light diverging cutout area 508 described with respect to FIGS. 5A and 5B are applicable to the light diverging cutout area 906. For example, the light diverging cutout area 906 may be smaller or larger than illustrated in FIG. 9. The light diverging cutout area 906 may also have a shape that is different from the shape illustrated in FIG. 9 and still diverge light as described above as well as with respect to the light diverging cutout area 508. For example, the light diverging cutout area 906 may have two or more sides instead of the third side 914. Further, the main panel 902 may have outer perimeter shapes other than illustrated in FIG. 9. Furthermore, although FIG. 9 shows a single parabolic protrusion (the parabolic protrusion 904), in alternative embodiments, the LEP 900 may include one or more parabolic protrusions extending from the same side of the main panel 902 as the parabolic protrusion 904.

FIG. 10 is a partial view of another example embodiment of an LEP 1000 that has a parabolic protrusion 1002. The LEP 1000 includes a main panel 1002 and a light diverging cutout area 1006. The LEP 1000 also has a front side and a back side (facing the page) that is opposite the front side. One or both of the first side and the back side of the LEP 1000 may emit light received through the light receiving side 1018 of the parabolic protrusion 1004. The parabolic protrusion 1004 extends out from the main panel 1002. In a particular embodiment, except for the light diverging cutout area 1006, the parabolic protrusion 1004 corresponds to the parabolic protrusion 704 of FIG. 7. For example, the parabolic protrusion 1004 has a first curved side, a second curved side, and a light receiving side 1018 between the first curved side and the second curved side.

In a particular embodiment, the light diverging cutout area 1006 is positioned on the parabolic protrusion 1004 close to the light receiving side 1018 of the parabolic protrusion 1004. The light diverging cutout area 1006 provides an air gap (i.e., a passageway) in the LEP 1000. The air gap extends through the front side of the LEP 1000 and through the back side of the LEP 1000. As indicated above, the front side of the LEP 1000 and the back side of the LEP 1000 are opposite sides of the LEP 1000. The light receiving side 1018 of the parabolic protrusion 1004 may pass light through towards the light diverging cutout area 1006.

In a particular embodiment, the light diverging cutout area 1006 includes a first curved side 1010 and a second curved side 1012. The light diverging cutout area 1006 also includes a third side 1014 and a fourth side 1016 are substantially straight sides. The first curved side 1010, the second curved side 1012, the third side 1014, and the fourth side 1016 form a substantially diamond-shaped outer perimeter of the light diverging cutout area 1006. The first curved side 1010 and the second curved side 1012 are closer to the light receiving side 1018 of the parabolic protrusion 1004 and have curvatures extending away from the light receiving side 1018 of the parabolic protrusion 1004 and towards the air gap in the light diverging cutout area 1006.

In a particular embodiment, each of the first curved side 1010 and the second curved side 1012 may have a substantially flat surface between the front side of the LEP 1000 and the back side of the LEP 1000. In an alternative embodiment, each of the first curved side 1010 and the second curved side 1012 may curve between the front side of the LEP 1000 and the back side of the LEP 1000 towards the air gap in the light diverging cutout area 1006. In other alternative embodiments, each of the first curved side 1010 and the second curved side 1012 may have a multi-faceted surface bulging towards the air gap in the light diverging cutout area 1006.

In a particular embodiment, the light diverging cutout area 1006 is configured to diverge light (for example, light from an LED) as the light passes through the light diverging cutout area 1006. For example, the light diverging cutout area 1006 may diverge light that enters the LEP 1000 through the light receiving side 1018 of the parabolic protrusion 1004 and reaches the light diverging cutout area 1006. The light diverging cutout area 1006 may diverge some light rays of the light that enter the light diverging cutout area 1006 towards one side of the light diverging cutout area 1006 and away from the center of the light diverging cutout area 1006. Similarly, the light diverging cutout area 1006 may diverge other light rays of the light that enter the light diverging cutout area 1006 towards another side of the light diverging cutout area 1006 away from the center of the light diverging cutout area 1006. An illustrative distribution of light rays of light in the LEP 1000 is shown in FIG. 17.

Although FIG. 10 shows the light diverging cutout area 1006 positioned entirely on the parabolic protrusion 1004, in alternative embodiment, the light diverging cutout area 1006 may be partially positioned on the parabolic protrusion and partially positioned on the main panel 1002. In other alternative embodiments, the light diverging cutout area 1006 may be positioned entirely on the main panel 1002. Further, in alternative embodiments, the light diverging cutout area 1006 may be smaller or larger than illustrated in FIG. 10. The light diverging cutout area 906 may also have a shape that is different from the shape illustrated in FIG. 100 and still diverge light substantially as described above. In a particular embodiment, the collimating effect of the light diverging cutout area 1006 may depend on the radius of the curvature of the first curved side 1010 and the second curved side 1012 of the light diverging cutout area 1006. Further, the main panel 1002 may have outer perimeter shapes other than illustrated in FIG. 10. In a particular embodiment, a reflector may sandwich the light diverging cutout area 1006 on both the front side of the LEP 1000 and the back side of the LEP 1000 to keep light from escaping out through the air gap in the light diverging cutout area 1006. For example, a high reflectance specular reflector, such as an aluminum reflector, may be used to sandwich the light diverging cutout area 1006 in a manner similar to the embodiment shown in FIG. 11. Furthermore, although FIG. 10 shows a single parabolic protrusion (the parabolic protrusion 804), in alternative embodiments, the LEP 1000 may include one or more parabolic protrusions extending from the same side of the main panel 1002 as the parabolic protrusion 1004.

In embodiments that include multiple parabolic protrusions, one or more parabolic protrusions may have no cutout area (e.g., the parabolic protrusion 704 of FIG. 4), one or more other parabolic protrusions may have a light collimating cutout area (e.g., the parabolic protrusion 804 of FIG. 8), and one or more other parabolic protrusions may have a light diverging cutout area (e.g., the parabolic protrusion 904 of FIG. 9 and the parabolic protrusion 1004 of FIG. 10).

FIG. 11 illustrates an example embodiment of a structure 1000 including the LEP 800 with the light collimating cutout area 806 covered by a reflector 1102. As described below with respect to FIG. 22, some light rays light that enter the light collimating cutout area 806 may escape out through the air gap of the light collimating cutout area 806 on both the front side and back side of the LEP 800. The reflector 1102 and another reflector (not shown) on the back side of the LEP 800 may sandwich the light collimating cutout area 806 to prevent light from escaping or reduce the amount of light that escapes out through the air gap. In a particular embodiment, the reflector 1102 may be a high reflectance specular reflector, such as aluminum reflector. The reflector 1102 may also be a plastic reflector or another type of reflector.

In alternative embodiments, the reflector 1102 may have other shapes and may be smaller or larger than illustrated in FIG. 11. For example, the reflector 1102 may be part of a reflector that covers parts of the main panel 802 of FIG. 8. Although described with respect to the light collimating cutout area 806, the reflector 1102 or variations thereof may be used with the light collimating cutout area 308 of FIGS. 3A and 3B, and the light diverging cutout area 1006 of FIG. 10.

FIG. 12 is an illustrative example of light distribution in an LEP 1202 of a lighting fixture 1200. The lighting fixture 1200 includes a light source 1204, such as an LED, positioned adjacent to a light receiving side 1208 of the LEP 1202.

FIG. 13 is an illustrative example of light distribution in the LEP 700 of a lighting fixture 1300. The lighting fixture 1300 includes the light source 1304, such as an LED, positioned adjacent to the light receiving side of the parabolic protrusion 704. Compared to the light distribution in the LEP 1200 of FIG. 12, some light rays of light from the light source 1304 are collimated by the parabolic protrusion 704.

FIG. 14 is an illustrative example of light distribution in the LEP 800 of a lighting fixture 1400. The lighting fixture 1400 includes the light source 1404, such as an LED, positioned adjacent to a light receiving side of the parabolic protrusion 804. Compared to the light distribution in the LEP 1200 of FIG. 12 and to the light distribution in the LEP 700 of FIG. 13, light from the light source 1404 is significantly more collimated by the light collimating cutout area 806 of the LEP 800.

Although a single parabolic protrusion 804 is shown in FIG. 14, in alternative embodiments, the lighting fixture 1400 may include multiple parabolic protrusions extending from the main panel 802 along the same side of the main panel 802 as the parabolic protrusion 804. Each additional parabolic protrusion may have a corresponding light source.

FIG. 15 is a close up view of the light distribution in the LEP 800 of the lighting fixture 1400, near the parabolic protrusion 804 and the light collimating cutout area 806 of the LEP 800 of FIGS. 8 and 14. Light rays 1504 and light rays 1506 of the light from the light source 1404 travel outside of the light collimating cutout area 806 towards the main panel 802. As illustrated in FIG. 15, light rays 1502 enter the light collimating cutout area 806 through the first side 810 and leave the light collimating cutout area 806 through the second side 812 of the light collimating cutout area 806. As the tight rays 1502 travel through the light collimating cutout area 806, the light rays 1502 are collimated by the light collimating cutout area 806.

FIG. 16 is an illustrative example of light distribution in the LEP 900 of the lighting fixture 1600. The lighting fixture 1600 includes the light source 1604, such as an LED, positioned adjacent to a light receiving side of the parabolic protrusion 904. Compared to the light distribution in the LEP 1200 of FIG. 12 and to the light distribution in the LEP 700 of FIG. 13, light from the light source 1604 is significantly diverged by the light diverging cutout area 906 of the LEP 900. Some light rays 1612 of the light from the light source 1604 are directed to one side of the light diverging cutout area 906 without entering the light diverging cutout area 906. Similarly, some light rays 1614 of the light from the light source 1604 are directed to another side of the light diverging cutout area 906 without entering the light diverging cutout area 906. As described above with respect to FIG. 9, the light diverging cutout area 906 may function as a total internal reflection (TIR) reflector to reflect the light rays of the light from light source 1604 that reach the light diverging cutout area 906 through the LEP 900.

Although a single parabolic protrusion 904 is shown in FIG. 16, in alternative embodiments, the lighting fixture 1600 may include multiple parabolic protrusions extending from the main panel 902 along the same side of the main panel 902 as the parabolic protrusion 904. Each additional parabolic protrusion may have a corresponding light source.

FIG. 17 is an illustrative example of light distribution in the LEP 1000 of the lighting fixture 1700. The lighting fixture 1700 includes the light source 1704, such as an LED, positioned adjacent to a light receiving side of the parabolic protrusion 1004. Compared to the light distribution in the LEP 1200 of FIG. 12 and to the light distribution in the LEP 700 of FIG. 13, the light from the light source 1604 is significantly more diverged by the light diverging cutout area 1006 of the LEP 1000. Further, compared to the light distribution in the LEP 900 of FIG. 16, the light from the light source 1604 is more diverged by the light diverging cutout area 1006 of the LEP 900. Some light rays 1712 of the light from the light source 1704 are directed to one side of the light diverging cutout area 1006, while some light rays 1714 of the light from the light source 1704 are directed to another side of the light diverging cutout area 1006. In contrast to the light rays 1612 and 1614 of FIG. 16 that do not enter the light diverging cutout area 906, the light rays 1712 and 1714 are diverged through the light diverging cutout area 1006. The light rays 1712 and 1714 enter the light diverging cutout area 1006.

Although a single parabolic protrusion 1004 is shown in FIG. 16, in alternative embodiments, the lighting fixture 1600 may include multiple parabolic protrusions extending from the main panel 1002 along the same side of the main panel 1002 as the parabolic protrusion 1004. Each additional parabolic protrusion may have a corresponding light source.

In embodiments of the lighting fixtures 1400, 1600, and 1700 that include multiple parabolic protrusions, one or more parabolic protrusions may have no cutout area (e.g., the parabolic protrusion 704 of FIG. 4), one or more other parabolic protrusions may have a light collimating cutout area (e.g., the parabolic protrusion 804 of FIG. 8), and one or more other parabolic protrusions may have a light diverging cutout area (e.g., the parabolic protrusion 904 of FIG. 9 and the parabolic protrusion 1004 of FIG. 10). Further, although each of the LEPs in FIGS. 7-11 and 13-17 are illustrated and described as having a parabolic protrusion, in alternative embodiments, each of the LEPs 700, 800, 900, 1000, 1100 may instead have a different conic-shaped protrusion or a non-conic shaped protrusion without departing from the scope of the description above or from the scope of this specification.

FIG. 18 is an example embodiment of a lighting fixture 1800 including an LEP 1802 having a parabolic area 1808, which is a light entrance area of the LEP 1802, partially bounded by air gaps 1810 and 1812 in the LEP 1802. The lighting fixture 1800 includes a light source 1804 (e.g., an LED) positioned adjacent to a light receiving side 1814 of the LEP 1802. The light receiving side 1814 may pass light through from the light source 1804 for emitting by the LEP 1802. The LEP 1802 includes a light emitting side (a front side) that includes grooves 1806. The LEP 1802 also includes a back side that is the side of the LEP opposite of the front side having the grooves 106. The LEP 1802 may emit a portion of the light from the light source 1804 through the front side of the LEP 1802 and may emit a portion of the light from the light source 1804 through the back side of the LEP 1802. In a particular embodiment, the LEP 1802 may also include grooves on the back side of the LEP 1802.

The LEP 1802 includes a first air gap 1810 and a second air gap 1812. The LEP 1802 also includes a parabolic area 1808 having a first curved side bordering the first air gap 1810 and a second curved side bordering the second air gap 1812. The first air gap 1810 and the second air gap 1812 extend inwards from the light receiving side 1814 towards a far end side 1816 of the LEP and away from each other. Each of the first air gap 1810 and the second air gap 1812 also extends through the front side and the back side of the LEP 1802. In a particular embodiment, the first air gap 1810 and the second air gap 1812 may operate as total internal reflection (TIR) reflectors. The parabolic area 1808 may collimate the light from the light source 1804 by virtue of the first air gap 1810 and the second air gap 1812 bordering the parabolic area 1808 and functioning as TIR reflectors.

In a particular embodiment, the first air gap 1810 and the second air gap 1812 may be formed by cutting (for example, using a laser-cut process) through an LEP. In other embodiments, the first air gap 1810 and the second air gap 1812 may also be made using another process (e.g., molding) during the production of the LEP 1902.

Although FIG. 18 show each of the first air gap 1810 and the second air gap 1812 as having two curved sides, in alternative embodiments, the side of each of the first air gap 1810 and the second air gap 1812 that does not border the parabolic area 1808 may not be curved. Further, in alternative embodiments, the first air gap 1810 and the second air gap 1812 may be smaller or larger than illustrated in FIG. 18, and may have a smaller or larger curvature.

FIG. 19 is a partial view of an example embodiment of a lighting fixture 1900 including an LEP 1902 that has two parabolic light entrance areas that are each partially bounded by corresponding air gaps in the LEP 1902. The lighting fixture 1900 includes a first light source 1904 and a second light source 1814. The LEP 1902 includes a light receiving side 1922 that passes light through from the light sources 1904 and 1914 for emitting by the LEP 1902. The LEP 1902 includes a front side and a back side as described above with respect to other LEPs (for example, the LEP 1802 of FIG. 18). The LEP 1902 may emit a portion of the light from the light sources 1904, 1914 through the front side of the LEP 1902 and may emit a portion of the light through the back side of the LEP 1902.

The LEP 1902 includes a first parabolic area 1906 that is partially bounded by a first air gap 1908 and a second air gap 1910. The first parabolic area 1906 is also partially bounded by a portion of the light receiving side 1922 between the first air gap 1908 and the second air gap 1910. The LEP 1902 also includes a second parabolic area 1916 that is partially bounded by a third air gap 1918 and a fourth air gap 1920. The second parabolic area 1916 is also partially bounded by a portion of the light receiving side 1922 between the third air gap 1918 and the fourth air gap 1920. The first air gap 1908 and the second air gap 1910 extend inwards from the light receiving side towards the far end side of the LEP 1902 and away from each other. Similarly, the third air gap 1918 and the fourth air gap 1920 extend inwards from the light receiving side towards the far end side of the LEP 1902 and away from each other. Each of the first air gap 1908, the second air gap 1910, the third air gap 1918, and the fourth air gap 1920 extends through the front side and the back side of the LEP 1902. In a particular embodiment, the far send side of the LEP 1902 corresponds to the far end side 1816 of the LEP 1802 shown in FIG. 18.

In a particular embodiment, each of the first air gap 1908, the second air gap 1910, the third air gap 1918, and the fourth air gap 1920 may operate as total internal reflection (TIR) reflectors. The parabolic area 1906 may collimate the light from the light source 1904 by virtue of the first air gap 1908 and the second air gap 1910 bordering the parabolic area 1906 and functioning as TIR reflectors. Similarly, the parabolic area 1916 may collimate the light from the light source 1914 by virtue of the third air gap 1918 and the fourth air gap 1920 bordering the parabolic area 1916 and functioning as TIR reflectors.

In a particular embodiment, the air gaps 1908, 1910, 1918, 1920 may be cut (for example, using a laser-cut process) in the LEP 1902. In other embodiments, the air gaps 1908, 1910, 1918, 1920 may also be made using another process (e.g., molding) during the production of the LEP 1902.

In a particular embodiment, a mechanical attachment area 1912 partially bounded by the second air gap 1910 and the third air gap 1918 may be used to mechanically attach the LEP 1902 to an other structure, such as a metal frame of the lighting fixture 1900. Because the second air gap 1910 and the third air gap 1918 function as TIR reflectors to light from the light source 1904 and to light from the light source 1914, respectively, the mechanical attachment area 1912 is an optically inactive area with respect to direct light from the light sources 1904 and 1914. Pins, holes, screws, and other suitable attachment means may be used in the mechanical attachment area 1912 to attach the LEP 1902 to another structure.

Although FIG. 19 show each of the air gaps 1908, 1910, 1918, 1920 as having two curved sides, in alternative embodiments, the side of each air gap 1908, 1910, 1918, 1920 that does not border a corresponding parabolic area 1906, 1916 may not be curved. Further, in alternative embodiments, the air gaps 1908, 1910, 1918, and 1920 may be smaller or larger than illustrated in FIG. 19, and may have a smaller or larger curvature.

FIG. 20 is a partial view of an example embodiment of a lighting fixture 2000 including an LEP 2002 that has a parabolic area 2006, which is a light entrance area of the LEP 2002, partially bounded by air gaps in the LEP 2002. In a particular embodiment, the lighting fixture 2000 includes a light source (e.g., an LED) that is placed adjacent to a light receiving side 2018 of the LEP 2002. The LEP 2002 includes a parabolic area 2006 that is partially bounded by a first air gap 2008 and a second air gap 2010. In a particular embodiment, the first air gap 2008 and the second air gap 2010 may function as total internal reflection (TIR) reflectors. The parabolic area 2006 may collimate the light from the light source 2004 by virtue of the first air gap 2008 and the second air gap 2010 functioning as TIR reflectors.

The LEP 2002 also includes an air gap 2012 that is formed in the LEP 2002. In a particular embodiment, the air gap 2012 is substantially V-shaped. The air gap 2012 extends through the front side and the back side of the LEP 2002. The air gap 2012 is positioned partially within the parabolic area 2006. The air gap 2012 may function as a TIR reflector and may diverge light from the light source 2004 around the air gap 2012.

A mechanical attachment area 2014 that is partially bounded by the substantially air gap 2012 may be used for attaching the LEP 2002 to a structure, such as a lighting fixture frame. The mechanical attachment area 2014 is an optically inactive area with respect to light from the light source 2004 that passes through the parabolic area 2006.

Although FIG. 20 shows the air gap 2012 positioned partially within the parabolic area 2006, in alternative embodiments, the air gap 2012 may be positioned entirely outside of the parabolic area 2006, or entirely within the parabolic area 2006. Further, although the air gap 2012 is substantially V-shaped, in alternative embodiments, the air gap 2012 may have other shapes and substantially function in a manner described above. Multiple air gaps may also be used instead of a single air gap, as described below with respect to FIG. 21. Furthermore, a cutout area, such as the light collimating cutout area 806 and the light diverging cutout area 906, 1006, may be included in the LEP 2002 instead of the air gap 2012. Although FIG. 20 shows a single parabolic area (i.e., the parabolic area 2006), in alternative embodiments, the LEP 2002 may include multiple parabolic areas and with a corresponding collimating or diverging air gap or cutout area positioned within or outside of each parabolic area.

FIG. 21 is another example embodiment of a lighting fixture 2100 including an LEP 2102 that has a parabolic area 2106, which is a light entrance area of the LEP 2102, partially bounded by air gaps in the LEP 2102. In a particular embodiment, the lighting fixture 2100 includes a light source 2104 (e.g., an LED) positioned adjacent to a light receiving side 2118 of the LEP 2102. A first air gap 2108 and a second air gap 2110 extend into the LEP 2102 from the light receiving side 2118 and away from each other. The first air gap 2108 and the second air gap 2110 may function as total internal reflection (TIR) reflectors to light from the light source.

In a particular embodiment, the parabolic area 2106 is partially bounded by the first air gap 2108 and the second air gap 2110. The parabolic area 2106 may collimate the light from the light source 2104 by virtue of the first air gap 2108 and the second air gap 2110 functioning as TIR reflectors.

The LEP 2102 also includes a third air gap 2112 and a fourth air gap 2114 that are formed in the LEP 2002. The third air gap 2112 and the fourth air gap 2114 extend through the front side and the back side of the LEP 2102. The third air gap 2112 and the fourth air gap 2114 are positioned partially within the parabolic area 2106. The third air gap 2112 and the fourth air gap 2114 extend in opposite directions with respect the light source 2104. The third air gap 2112 and the fourth air gap 2114 may function as TIR reflectors and diverge some light rays of light from the light source 2104. Some light rays of the light from the light source 2104 may pass through a space in the LEP 2102 between the third air gap 2112 and the fourth air gap 2114 without being diverged or otherwise affected by the third air gap 2112 and the fourth air gap 2114.

Although FIG. 21 shows the third air gap 2112 and the fourth air gap 2114 positioned partially within the parabolic area 2106, in alternative embodiments, the third air gap 2112 and the fourth air gap 2114 may be positioned entirely outside of the parabolic area 2006, or entirely within the parabolic area 2006. Further, although the third air gap 2112 and the fourth air gap 2114 are substantially trapezoid-shaped, in alternative embodiments, the third air gap 2112 and the fourth air gap 2114 may have other shapes and substantially function in a manner described above. Although FIG. 21 shows a single parabolic area (i.e., the parabolic area 2106), in alternative embodiments, the LEP 2102 may include multiple parabolic areas and with corresponding air gaps positioned within or outside of each parabolic area.

Although each of the LEPs in FIGS. 18-21 are illustrated and described as having a parabolic light entrance area, in alternative embodiments, each of the LEPs 1802, 1902, 2002, and 2102 may instead have a different conic-shaped light entrance area or a non-conic-shaped light entrance area without departing from the scope of the description above or from the scope of this specification.

FIG. 22 is an illustrative cross sectional view of a lighting fixture 2200 including the LEP 800 of FIG. 8. FIG. 22 illustrates an example light distribution in the y-z plane shown in FIG. 8. Light rays from a light source 2204 (e.g., an LED) pass through the light receiving side 818 of the LEP 800 and travel towards the light collimating cutout area 806. Some light rays of the light from the light source 2204 enter the air gap in the light collimating cutout area 806 through the first side 810 of the light collimating cutout area 806. Light rays 2212 travel through the air gap towards a top opening of the light collimating cutout area 806, and light rays 2214 travel through the air gap towards a bottom opening of the light collimating cutout area 806. Light rays 2210 travel through the air gap towards a surface of the second side 812 of the light collimating cutout area 806 and re-enter the rest of the LEP 800 to be emitted by one or both of the front side 2202 and back side 2220 of LEP 800. As illustrated in FIG. 22, the surface of the first side 810 of the light collimating cutout area 806 is substantially flat. As described above with respect to FIG. 11, the light collimating cutout area 806 may be sandwiched by reflectors at both the top opening and the bottom opening of the air gap to reduce or eliminate light escaping through the air gap openings.

FIG. 23 is another illustrative cross sectional view of a lighting fixture 2300 including the LEP 800 of FIG. 8. FIG. 23 illustrates an example light distribution in the y-z plane shown in FIG. 8. Light rays from a light source 2304 (e.g., an LED) pass through the light receiving side 818 of the LEP 800 and travel towards the light collimating cutout area 806. Some light rays of the light from the light source 2304 enter the air gap in the light collimating cutout area 806 through the first side 810 of the light collimating cutout area 806. Light rays 2312 of the light rays that enter the air gap travel through the air gap towards a top opening of the light collimating cutout area 806, and other light rays 2314 of the light rays that enter the air gap travel through the air gap towards a bottom opening of the light collimating cutout area 806. Some light rays 2310 of the light rays that enter the air gap travel through the air gap towards a surface of the second side 812 of the light collimating cutout area 806 and re-enter the rest of the LEP 800 to be emitted by one or both of the front side 2202 and the back side 2220 of LEP 800.

As described above with respect to FIG. 11, the light collimating cutout area 806 may be sandwiched by reflectors at both the top opening and the bottom opening of the light collimating cutout area 806 to reduce or eliminate light escaping through the openings. Because reflectors are not generally 100% efficient, the surface of the first side 810 of the light collimating cutout area 806 may be designed such that more light rays of the light from the light source 2304 that enter the air gap are directed towards the surface of the second side 812 of the light collimating cutout area 806 without first being reflected off a reflector. For example, as illustrated in FIG. 23, the surface of the first side 810 of the light collimating cutout area 806 is curved between the top opening and the bottom opening of the light collimating cutout area 806. Compared to FIG. 22, significantly more light rays of the light that enter the air gap travel directly towards the surface of the second side 812 of the light collimating cutout area 806. Thus, as compared to the flat surface of the first side 810 shown in FIG. 22, the curved surface of the first side 810 in FIG. 23 may provide an improved efficiency of light transfer through the light collimating cutout area 806. Further, the curved surface of the first side 810 can be used to change the vertical light distribution within the LEP 800, which in turn may change the distribution of light emitted by the LEP 800.

Although described with respect to the surface of the first side 810 of the light collimating cutout area 806, a curved surface of each of the first side 1010 and the second side 1012 of the light diverging cutout area 1006 of FIG. 10 may also provide improved efficiency of light transfer through the air gap of the light diverging cutout area 1006.

FIG. 24 is another illustrative cross sectional view of a lighting fixture 2400 including the LEP 800 of FIG. 8. FIG. 24 illustrates an example light distribution in the y-z plane shown in FIG. 8. As illustrated in FIG. 24, the surface of the first side 810 of the light collimating cutout area 806 is multi-faceted and bulges towards the second side 812 of the light collimating cutout area 806. Compared to FIG. 22, significantly more light rays of the light from the light source 2404 that enter the air gap travel directly towards the surface of the second side 812 of the light collimating cutout area 806.

Although FIGS. 22-24 are described with respect to the surface of the first side 810 of the light collimating cutout area 806, as compared to a substantially flat surface shown in FIG. 22, a curved surface or a multi-faceted of each of the first side 1010 and the second side 1012 of the light diverging cutout area 1006 of FIG. 10 may provide improved efficiency of light transfer through the air gap of the light diverging cutout area 1006. Light transfer through embodiments of a cutout area may be improved by using a curved or multi-faceted surface of one or more sides of the cutout area, where light rays of light from a light source enter the one or more sides to pass through the cutout area before being emitted by the LEP.

Embodiments of LEPs described throughout this specification may be LEP 302 may be made from an acrylic material. Air gaps and cutout areas in the LEPs may be made using methods known to those skilled in the art, such as cutting (e.g., laser-cutting), molding, other methods, or a combination. Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A light emitting panel (LEP), comprising: a first LEP side configured to emit light; a second LEP side, the first LEP side and the second LEP side being opposite sides of the LEP; a void area providing an air gap in the LEP through the first LEP side and the second LEP side, wherein the void area includes a first sidewall and a second sidewall and wherein at least a portion of the first sidewall is multi-faceted or curved from the first LEP side to the second LEP side; and a light receiving side, wherein the void area is proximal to the light receiving side and wherein the light receiving side is configured to pass light through towards the void area.

2. The LEP of claim 1, further comprising:
   a first reflector covering the void area on the first LEP side; and
   a second reflector covering the void area on the second LEP side.

3. The LEP of claim 1, wherein the void area is configured to collimate the light as the light passes through the void area.

4. The LEP of claim 3, wherein the void area further comprises:
   a third sidewall extending between the first sidewall and the second sidewall; and
   a fourth sidewall extending between the first sidewall and the second sidewall, wherein the first sidewall is closer to the light receiving side than the second sidewall.

5. The LEP of claim 4, wherein the first sidewall is curved towards the second sidewall relative to the third sidewall and the fourth sidewall, and wherein the second sidewall is curved towards the first sidewall relative to the third sidewall and the fourth sidewall.

6. The LEP of claim 1, wherein the void area is configured to diverge the light as the light passes through the void area.

7. The LEP of claim 6, the void area further comprises:
   a third sidewall extending from the first sidewall; and
   a fourth sidewall extending from the second sidewall, wherein the void area directs a first plurality of light rays of the light that pass through the first sidewall of the void area towards the fourth sidewall away from the third sidewall and wherein the void area directs a second plurality of light rays of the light that pass through the second sidewall of the void area towards the third sidewall away from the fourth sidewall.

8. The LEP of claim 1, wherein the void area is configured to diverge the light around the void area.

9. The LEP of claim 8, wherein the void area has a substantially V-shaped partial perimeter and wherein the void area is configured to direct a first plurality of light rays of the light around the first sidewall of the void area and to direct a second plurality of light rays of the light around the second sidewall of the void area.

10. A light emitting panel (LEP) comprising: a main panel; a protrusion extending out from the main panel, the protrusion having a light receiving side; and a void area proximal to the light receiving side, the void area providing an air gap in the LEP through a first side of the LEP and through a second side of the LEP, the first side of the LEP and the second side of the LEP being opposite sides of the LEP, wherein the LEP is configured to emit light through the first side of the LEP, wherein the void area includes a first sidewall and a second sidewall, wherein at least a portion of the first sidewall is multi-faceted or curved from the first LEP side to the second LEP side, wherein the light receiving side of the protrusion is configured to pass the light through towards the void area, and wherein the protrusion is configured to collimate the light.

11. The LEP of claim 10, wherein the void area is at least partially positioned on the protrusion.

12. The LEP of claim 11, wherein the void area is configured to diverge the light around the void area.

13. The LEP of claim 12, wherein the void area has a substantially V-shaped partial perimeter and wherein the void area is configured to direct a first plurality of light rays of the light around the first sidewall of the void area and to direct a second plurality of light rays of the light around the second sidewall of the void area.

14. The LEP of claim 13, wherein the void area further comprises a third sidewall and wherein the first sidewall, the second sidewall, and the third sidewall form a substantially triangular perimeter of the void area.

15. The LEP of claim 10, further comprising:
a first reflector covering the void area on the first LEP side; and
a second reflector covering the void area on the second LEP side.

16. The LEP of claim 15, wherein the void area is configured to collimate a plurality of light rays of the light.

17. The LEP of claim 16, wherein the void area comprises:
wherein the first sidewall is proximal to the light receiving side and wherein the second sidewall is distal from the light receiving side, the second sidewall being longer than the first sidewall;
a third sidewall extending between the first sidewall and the second sidewall; and
a fourth sidewall across from the third side and extending between the first sidewall and the second sidewall.

18. The LEP of claim 17, wherein the first sidewall is curved towards the second sidewall between the third sidewall and the fourth sidewall, and wherein the second sidewall is curved towards the first sidewall between the third side and the fourth side.

19. The LEP of claim 15, wherein the void area is configured to diverge the light as the light passes through the void area.

20. A light emitting panel (LEP), comprising:
a first LEP side configured to emit light;
a second LEP side, the first LEP side and the second LEP side being opposite sides of the LEP;
a light receiving side configured to pass the light through for emitting by the LEP; and
a light entrance area having a first curved side and a second curved side, wherein the light entrance area and a first optically inactive area of the LEP border a first air gap formed in the LEP, wherein the light entrance area and a second optically inactive area of the LEP border a second air gap formed in the LEP, wherein the light entrance area is partially bound by the first air gap and the second air gap, the first air gap and the second air gap extending inwards from the light receiving side and away from each other.

21. The LEP of claim 20, further comprising:
a second light entrance area having a third curved side bordering a third air gap in the LEP and a fourth curved side bordering a fourth air gap in the LEP, the third air gap and the fourth air gap extending inwards from the light receiving side and away from each other, wherein each of the third air gap and the fourth air gap extends through the first LEP side and the second LEP side.

22. The LEP of claim 21, further comprising a mechanical attachment area between the light entrance area and the second light entrance area, wherein the mechanical attachment area is between the second air gap and the third air gap.

23. The LEP of claim 20, further comprising a third air gap and a forth air gap that are joined to each other at a respective end to form a substantially V-shaped air gap that is positioned in front of the light entrance area, wherein the third air gap and the forth air gap are configured to diverge around the substantially V-shaped air gap light that reaches the substantially V-shaped air gap through the light entrance area, and wherein the third air gap and the forth air gap extend through the LEP between the first LEP side and the second LEP side.

24. The LEP of claim 23, wherein an optically inactive area of the LEP usable for mechanical attachment of the LEP is partially bounded by the substantially V-shaped air gap.

25. The LEP of claim 20, further comprising a void area providing a third air gap in the LEP through the first LEP side and the second LEP side, wherein a portion of the light receiving side between the first air gap and the second air gap is configured to pass the light through towards the void area.

26. The LEP of claim 25, wherein the void area is at least partially positioned in the light entrance area.

27. The LEP of claim 25, wherein the void area is configured to collimate a plurality of light rays of the light.

28. The LEP of claim 25, wherein the void area is configured to diverge the light as the light passes through the void area.

29. The LEP of claim 25, wherein the void area is configured to diverge the light around the cutout area.

* * * * *